US008948584B2

(12) United States Patent
Inoue et al.

(10) Patent No.: US 8,948,584 B2
(45) Date of Patent: *Feb. 3, 2015

(54) PHOTOELECTRIC CONVERSION DEVICE AND CAMERA SYSTEM

(71) Applicant: Canon Kabushiki Kaisha, Tokyo (JP)

(72) Inventors: Daisuke Inoue, Ebina (JP); Tomohisa Kinugasa, Yokohama (JP); Hirofumi Totsuka, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,160

(22) Filed: Jul. 1, 2013

(65) Prior Publication Data
US 2013/0314571 A1     Nov. 28, 2013

Related U.S. Application Data

(63) Continuation of application No. 13/302,010, filed on Nov. 22, 2011, now Pat. No. 8,503,873.

(30) Foreign Application Priority Data

Dec. 10, 2010   (JP) ................................. 2010-276333

(51) Int. Cl.
| G03B 13/36 | (2006.01) |
| G01J 1/44 | (2006.01) |
| H04N 5/232 | (2006.01) |
| H04N 5/225 | (2006.01) |

(52) U.S. Cl.
CPC .............. *G01J 1/44* (2013.01); *H04N 5/23212* (2013.01); *H04N 5/2251* (2013.01)
USPC .......................................... 396/125; 348/241

(58) Field of Classification Search
USPC .......................................... 396/125; 348/241
See application file for complete search history.

(56) References Cited

U.S. PATENT DOCUMENTS

| 5,698,844 | A | 12/1997 | Shinohara et al. | 250/214 R |
| 6,046,446 | A | 4/2000 | Kameshima et al. | 250/214.1 |
| 7,512,330 | B2 * | 3/2009 | Ichimiya | 396/96 |
| 7,697,051 | B2 * | 4/2010 | Krymski | 348/308 |
| 8,378,285 | B2 * | 2/2013 | Inoue | 250/208.1 |
| 8,503,873 | B2 * | 8/2013 | Inoue et al. | 396/125 |

(Continued)

FOREIGN PATENT DOCUMENTS

| CN | 1187695 | 7/1998 |
| CN | 1543186 | 11/2004 |
| CN | 101309084 | 11/2008 |
| JP | H09-200614 | 7/1997 |

OTHER PUBLICATIONS

Office Action issued on Nov. 27, 2013 in Chinese (PRC) patent application 201110409207.0, with translation.

*Primary Examiner* — W B Perkey
(74) *Attorney, Agent, or Firm* — Fitzpatrick, Cella, Harper & Scinto

(57) ABSTRACT

A photoelectric conversion device includes a common output line, a sensor cell unit which outputs a signal to the common output line, a transfer circuit unit which is connected to the common output line, holds a signal from the common output line in a transfer capacitor, and transfers the signal, first, second and third memory cell units each of which stores a signal from the common output line in a memory capacitor, inverts and amplifies the signal in the memory capacitor, and outputs the signal to the common output line.

15 Claims, 13 Drawing Sheets

(56) References Cited

U.S. PATENT DOCUMENTS

2002/0000508 A1* 1/2002 Muramatsu et al. ....... 250/208.1
2008/0074512 A1* 3/2008 Sung et al. .................... 348/241
2008/0284626 A1 11/2008 Hattori ......................... 341/133
2012/0147231 A1* 6/2012 Inoue et al. ................... 348/294

* cited by examiner

F I G. 4
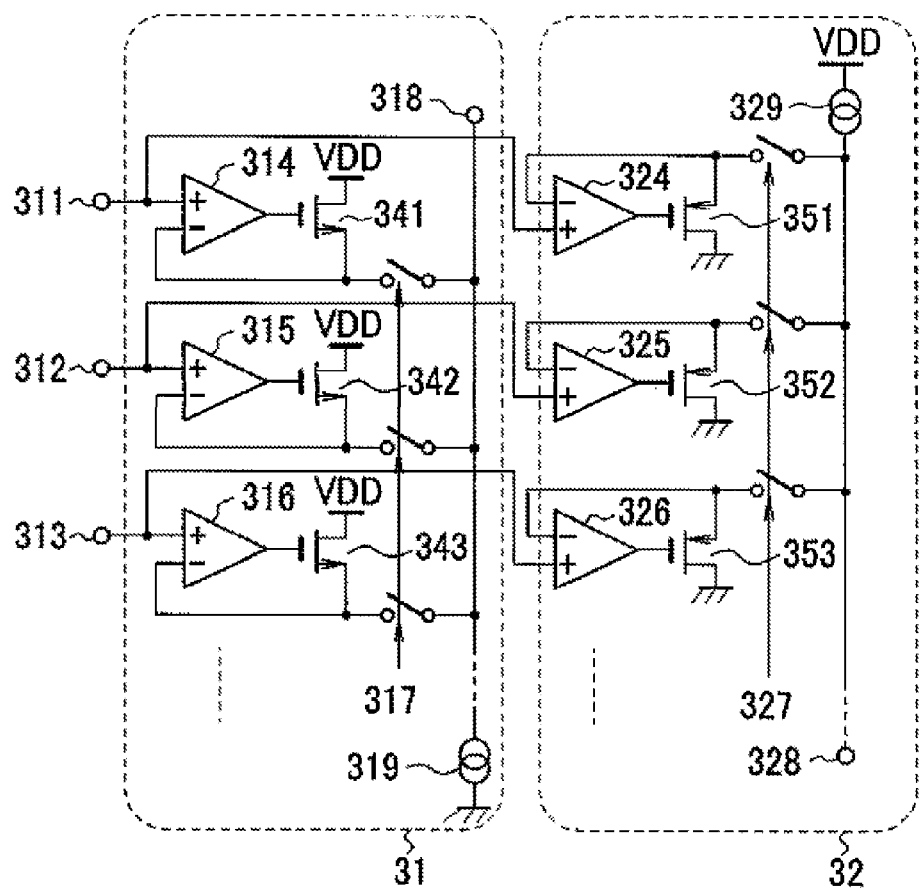

F I G. 12
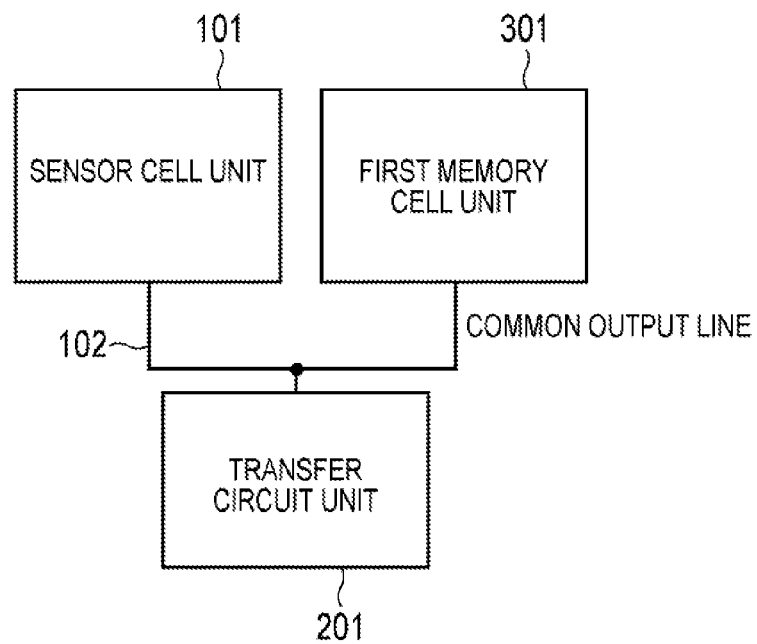
F I G. 13
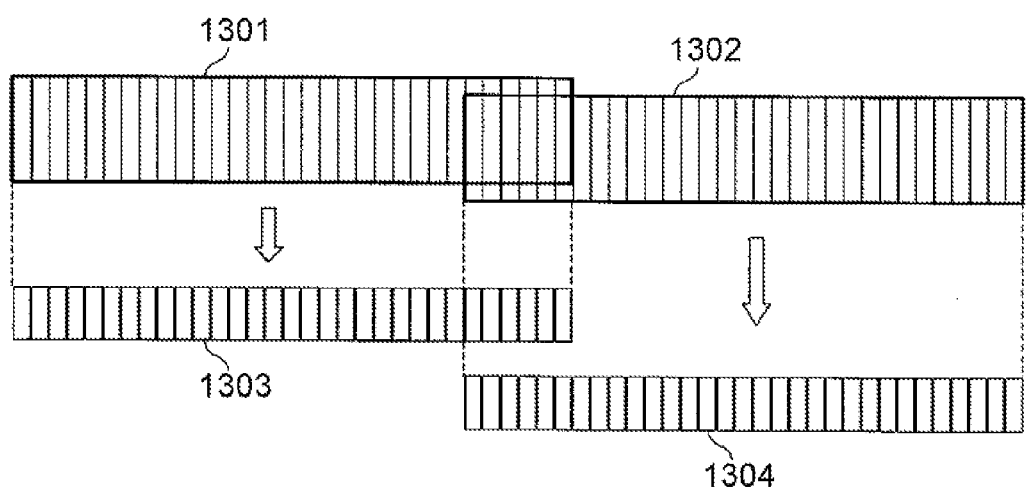

PHOTOELECTRIC CONVERSION DEVICE AND CAMERA SYSTEM

RELATED APPLICATIONS

The present application is a continuation of application Ser. No. 13/302,010, filed Dec. 22, 2011. The present application claims benefit of that application under 35 U.S.C. §120, and claims priority benefit under 35 U.S.C. §119 of Japanese Patent Application No. 2010-276333, filed Dec. 10, 2010. The entire contents of each of the two mentioned prior applications are incorporated herein by reference.

BACKGROUND OF THE INVENTION

1. Field of the Invention

The present invention relates to a photoelectric conversion device and a camera system.

2. Description of the Related Art

A conventional phase difference detection type focus detection apparatus calculates the defocus amount of an object by computing correlation of photoelectric conversion signals from a pair of line sensors, thereby performing auto focus. According to Japanese Patent Laid-Open No. 2006-220684, when providing a plurality of focus detection areas, the apparatus includes a plurality of accumulation control areas. In this case, sensor units configured for the respective areas are accompanied by storage units. The apparatus disclosed in Japanese Patent Laid-Open No. 2006-220684 includes two storage units accompanying the sensor unit to shorten the time required for focus detection in the case of a large defocus. For a general defocus, the apparatus performs correlation computation of the accumulated signal stored in the first storage unit. For a large defocus, the apparatus performs correlation computation of the accumulated signal stored in the second storage unit.

Japanese Patent Laid-Open No. 2002-77737 discloses a technique of increasing the dynamic range of an image sensor by providing intra-pixel capacitors and performing two kinds of exposures which differ in their exposure end times. At the end of the first exposure, the apparatus transfers the photocharge accumulated in each photodiode to a corresponding intra-pixel capacitor, and reads out a mixture of the photocharge accumulated in the photodiode and the charge in the intra-pixel capacitor at the end of the next exposure.

In addition, Japanese Patent Laid-Open No. 9-200614 discloses a reset noise reduction unit which improves the S/N ratio of a photoelectric conversion signal read out from a sensor.

SUMMARY OF THE INVENTION

The present invention provides a technique advantageous in performing focus detection with a small number of memory cell units.

The first aspect of the present invention provides a photoelectric conversion device comprising: a common output line; a sensor cell unit which outputs a signal photoelectrically converted by a photoelectric converter to the common output line; a transfer circuit unit which is connected to the common output line, holds a signal from the common output line in a transfer capacitor, and transfers the signal; a first memory cell unit which is connected to the common output line, stores a signal from the common output line in a first memory capacitor, inverts and amplifies the signal in the first memory capacitor, and outputs the signal to the common output line; a second memory cell unit which is connected to the common output line, stores a signal from the common output line in a second memory capacitor, inverts and amplifies the signal in the second memory capacitor, and outputs the signal to the common output line; and a third memory cell unit which is connected to the common output line, stores a signal from the common output line in a third memory capacitor, inverts and amplifies the signal in the third memory capacitor, and outputs the signal to the common output line, wherein the first memory cell unit writes, in the first memory capacitor, a reset noise signal originating from resetting of the photoelectric converter, the transfer capacitor, the first memory capacitor, the second memory capacitor, and the third memory capacitor, the third memory cell unit writes, in the third memory capacitor, a reset noise signal obtained by making the first memory cell unit invert and amplify a reset noise signal written in the first memory capacitor, the second memory cell unit writes, in the second memory capacitor, a reset noise signal obtained by making the third memory cell unit invert and amplify a reset noise signal written in the third memory capacitor, and the transfer circuit unit writes, in the transfer capacitor, a signal obtained by adding a signal obtained by making the second memory cell unit invert and amplify a reset noise signal written in the second memory capacitor to a signal output from the sensor cell unit.

The second aspect of the present invention provides a camera system comprising: a photoelectric conversion device defined as the first aspect; and a lens for forming an optical image on the photoelectric conversion device.

Further features of the present invention will become apparent from the following description of exemplary embodiments with reference to the attached drawings.

BRIEF DESCRIPTION OF THE DRAWINGS

FIG. 4 is a circuit diagram of maximum and minimum value detection circuits in the first embodiment;

FIG. 12 is a simplified view for explaining reset noise reduction driving of a photoelectric conversion device; and FIG. 13 is a schematic view for explaining two different accumulation control areas and memory cell areas.

DESCRIPTION OF THE EMBODIMENTS

Consider a case in which the technique disclosed in Japanese Patent Laid-Open No. 2006-220684 includes intra-pixel capacitors disclosed in Japanese Patent Laid-Open No. 2002-77737 to increase the dynamic range, and performs driving operation which allows switching between a low sensitivity mode and a high sensitivity mode. This technique further requires two storage units for holding reset noise in the low sensitivity mode and the high sensitivity mode. The technique requires two storage units for holding signals from two different accumulation control areas and two storage units for holding signals in the different sensitivity modes, namely the low sensitivity mode and the high sensitivity mode. That is, the technique includes a total of four storage units. Even the use of the technique disclosed in Japanese Patent Laid-Open No. 9-200614 makes it necessary to prepare four storage units per pixel. Increasing the number of storage units to cope with the two functions of the area and sensitivity modes will lead to increases in chip area and cost.

On the other hand, when different accumulation control areas are provided for a plurality of objects having different defocus amounts, a plurality of storage units are required. When, for example, at least two accumulation control areas are provided for near and far objects in the frame, four storage units are provided for each pixel. That is, since four kinds of measurement point placement methods are provided, four storage units are required for each pixel for each kind.

(First Embodiment)

For the understanding of the basic operation of a photoelectric conversion device, the operation of the photoelectric conversion device in FIG. 12 will be described first with reference to a simplified view for explaining reset noise reduction driving. Referring to FIG. 12, a sensor cell unit 101 is connected to a memory cell unit 301 via a transfer circuit unit 201 and a common output line 102. In the basic operation, this device resets the sensor cell unit 101 and the memory cell unit 301, and writes reset noise N from the sensor cell unit 101 in the memory cell unit 301. At the same time, the sensor cell unit 101 accumulates an optical signal S. The device sequentially transfers the reset noise N from the memory cell unit 301 and an accumulated signal (S+N) from the sensor cell unit 101 to the transfer circuit unit 201. The device then performs differential processing (S+N−N) of subtracting the reset noise N from the accumulated signal (S+N), and writes only the accumulated signal S obtained by improving the S/N ratio of the accumulated signal in the memory cell unit 301. The processing circuit on the subsequent stage performs AF signal processing by using this accumulated signal.

Figure 1:
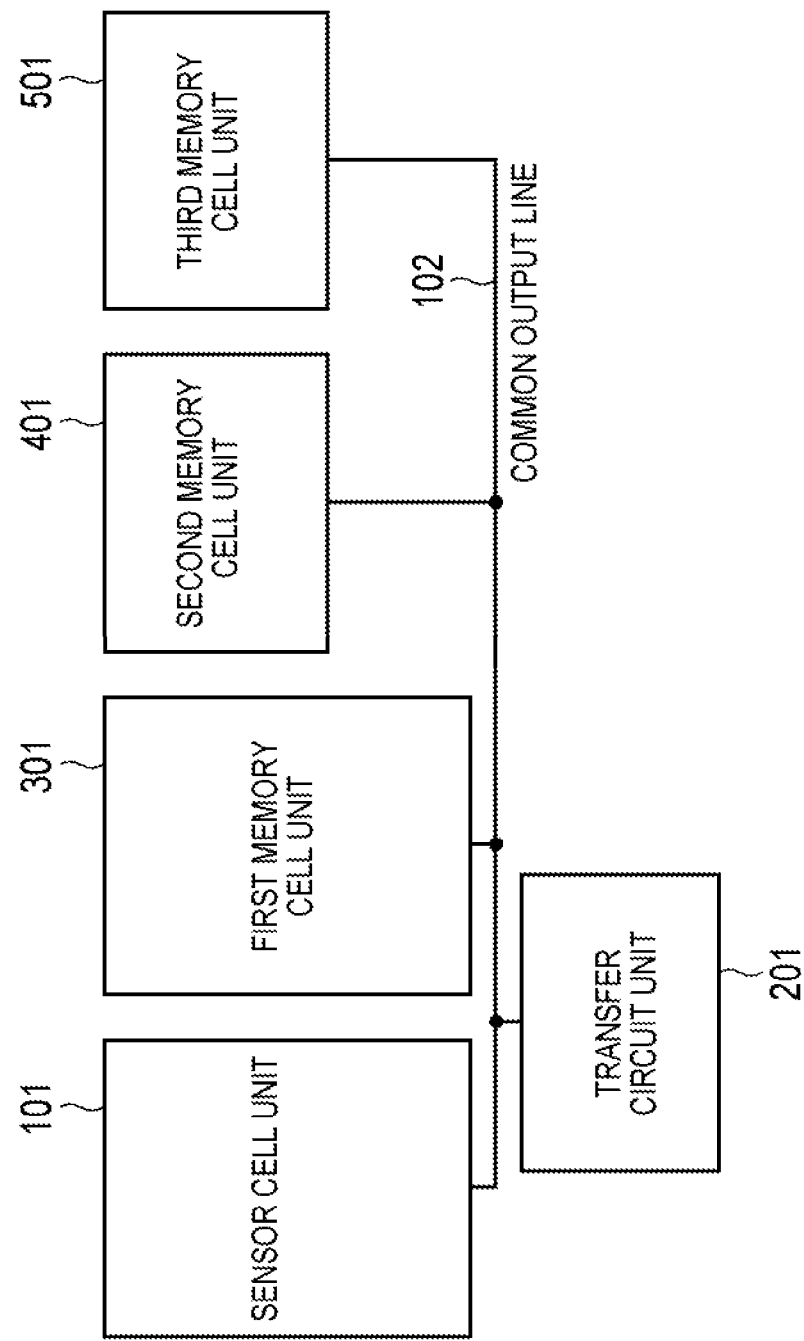
FIG. 1 is a block diagram of a photoelectric conversion device according to the first embodiment of the present invention.

FIG. 1 is a block diagram of the photoelectric conversion device according to the first embodiment of the present invention. This embodiment provides three memory cell units 301, 401, and 501. This device copes with two different sensitivity modes and two exposure times by making the three memory cell units 301, 401, and 501 overwrite reset noise depending on the sensitivity mode. Although reset operation is the same as the basic operation, the device holds reset noise N1 in the low sensitivity mode in the first memory cell unit 301, and holds reset noise N2 in the high sensitivity mode in the second memory cell unit 401 and the third memory cell unit 501. This device has as its feature to use reset noise from two memory cell units in accordance with the accumulation control areas with different accumulation times. In the first operation mode (the high sensitivity mode under a low luminance environment), the device performs S−N operation by using the reset noise N2 held in the second memory cell unit 401 and the third memory cell unit 501. In the second operation mode (the lower sensitivity mode under a high luminance environment), the device temporarily overwrites the third memory cell unit 501 with the reset noise N1 held in the first memory cell unit 301 to store −N1'. Thereafter, the device overwrites the second memory cell unit 401 with −N1' held in the third memory cell unit 501 to store N1". For this reason, it is possible to handle N1 held in the first memory cell unit 301 and N1" held in the second memory cell unit 401 as almost identical reset noise N1. In the first and second operation modes, therefore, letting S1 be an optical signal in the first accumulation control area and S2 be an optical signal in the second accumulation control area, the device performs S1−N1 operation and S2−N1" operation in correspondence with the two accumulation control areas with different accumulation times, thereby obtaining a signal having a high S/N ratio.

The two different accumulation control areas will be described next. FIG. 13 is a schematic view explaining two different accumulation control areas and corresponding memory cell areas. Referring to FIG. 13, the device includes a first accumulation control area 1301, a second accumulation control area 1302, a first memory cell area 1303 corresponding to the first accumulation control area 1301, and a second memory cell area 1304 corresponding to the second accumulation control area 1302. The accumulation control areas are equivalent to automatic focus detection areas, and correspond to so-called measurement points. The cells obtained by dividing each accumulation control area are sensor cell units. The cells obtained by dividing each memory cell area are memory cell units. The sensor cell units are lined into the accumulation control areas. Since the first and second accumulation control areas 1301 and 1302 overlap each other, the memory cell areas 1303 and 1304 are required. Arranging a plurality of accumulation control areas in this manner will increase the number of measurement points.

Figure 2:
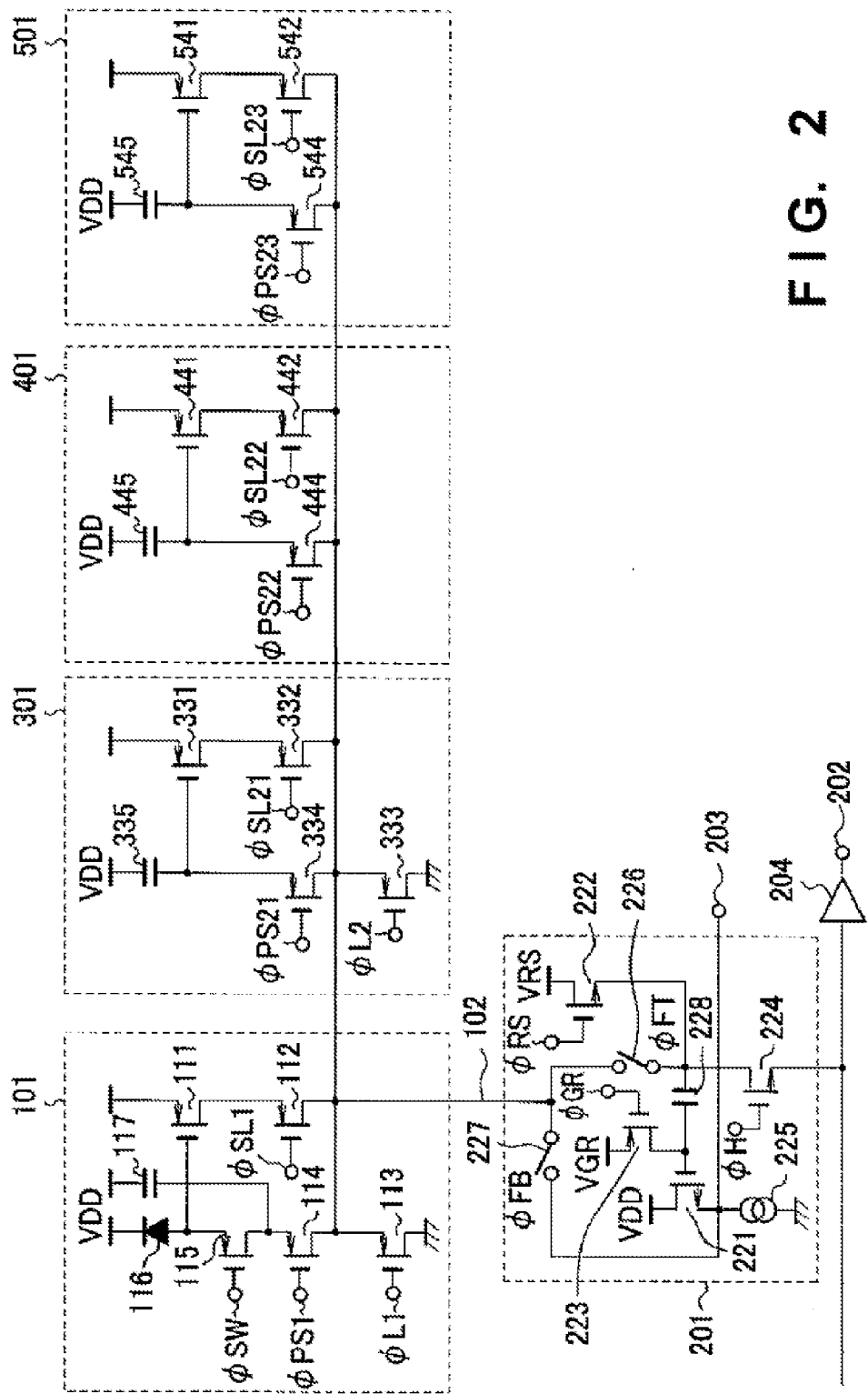
FIG. 2 is a circuit diagram of the photoelectric conversion device according to the first embodiment of the present invention.

FIG. 2 is a circuit diagram showing the arrangement of the photoelectric conversion device according to this embodiment. Referring to FIG. 2, the sensor cell unit 101 and the transfer circuit unit 201 each are connected to the common output line 102, together with the first memory cell unit 301, the second memory cell unit 401, and the third memory cell unit 501. In this embodiment, three memory cell units are provided in correspondence with one sensor cell unit. In addition, a combination of a plurality of sensor cell units and a plurality of memory cell units can be made to function as an area sensor.

Each of the blocks of the sensor cell unit 101, first memory cell unit 301, second memory cell unit 401, third memory cell unit 501, and transfer circuit unit 201 will be described next. The sensor cell unit 101 includes a photodiode (PD) 116, a capacitor element (CP) 117 for sensitivity switching, and PMOS transistors 111 to 115. The PMOS transistor 115 functions as a sensitivity switch (sensitivity switching unit) which switches between the low sensitivity mode and the high sensitivity mode in accordance with a signal φSW. In the high sensitivity mode, a parasitic capacitance Cpd (not shown) of the PD 116 functions as a detection capacitance to determine a sensitivity. In the low sensitivity mode, the PMOS transistor (sensitivity switch) 115 is turned on to connect the parasitic capacitance Cpd and the capacitor element CP 117 in parallel with a power supply voltage VDD. This forms a detection capacitance (Cpd+CP) for determining sensitivity. The PMOS transistor 112 functions as a select switch to select a plurality of sensor cell units in accordance with a signal φSL1. In addition, the PMOS transistor 114 and the PMOS transistor 115 function as switches which reset the residual charge in the photodiode (PD) 116 and write pixel portion reset noise at the time of auto gain control in accordance with a signal φPS1 and the signal φSW. In this case, the reset level is a constant voltage VRS of the transfer circuit unit 201 (to be described later). The sensor cell unit 101 includes an inverting amplifier having an amplification again of −1. The inverting amplifier includes the PMOS transistor 111 and the PMOS transistor (load element) 113. The PMOS transistor 113 is controlled by a signal φL1. The PD 116 is a photoelectric converter which converts light into an electrical signal by photoelectric conversion. The sensor cell unit 101 outputs the signal photoelectrically converted by the PD 116 to the common output line 102. The first memory cell unit 301 includes PMOS transistors 331 to 334 and a first memory capacitor (CM$_1$) 335. The second memory cell unit 401 includes PMOS transistors 441 to 444 and a second memory capacitor (CM$_2$) 445. The third memory cell unit 501 includes PMOS transistors 541 to 544 and a second memory capacitor (CM$_3$) 545. The PMOS transistors 332, 442, and 542 function as select switches which select memory cell units in accordance with signals φSL21, φSL22, and φSL23. The PMOS transistors 334, 444, and 544 function as switches which reset the memory capacitors 335, 445, and 545 and write reset noise from the sensor cell unit 101 in accordance with the signals φPS21, φPS22 and φPS23. The memory cell units 301, 401, and 501 each include an inverting amplifier having an amplification gain of −1. The inverting amplifier of the first memory cell unit 301 includes the PMOS transistor 331 and the load PMOS transistor 333. The PMOS transistor 333 is controlled by a signal φL2. The inverting amplifier of the second memory cell unit 401 includes the PMOS transistor 441 and the load PMOS transistor 333. The inverting amplifier of the third memory cell unit 501 includes the PMOS transistor 541 and the load PMOS transistor 333. The inverting amplifier shares the load PMOS transistor 333 with the first memory cell unit 301, the second memory cell unit 401, and the third memory cell unit 501. It is however possible to provide load PMOS transistors for the respective memory cell units. The first memory cell unit 301 is connected to the common output line 102 to store a signal from the common output line 102 in the first memory capacitor (CM$_1$) 335 and output a signal from the first memory capacitor (CM$_1$) 335 to the common output line 102 upon inversion and amplification by the inverting amplifier. The second memory cell unit 401 is connected to the common output line 102 to store a signal from the common output line 102 in the second memory capacitor (CM$_2$) 445 and output a signal from the second memory capacitor (CM$_2$) 445 to the common output line 102 upon inversion and amplification by the inverting amplifier. The third memory cell unit 501 is connected to the common output line 102 to store a signal from the common output line 102 in the third memory capacitor (CM$_3$) 545 and output a signal from the third memory capacitor (CM$_3$) 545 to the common output line 102 upon inversion and amplification.

The transfer circuit unit 201 includes a transfer switch 226, a feedback switch 227, a transfer capacitor (TC) 228 connected to the common output line 102, and an NMOS source follower for reading out the potential of the CT 228. The transfer switch 226 and the feedback switch 227 are switches for turning on/off the connection to the common output line 102. The transfer switch 226 and the feedback switch 227 are MOS transistors, which may be either of the following types: PMOS, NMOS, and CMOS. The transfer switch 226 and the feedback switch 227 are respectively on/off-controlled by signals φFT and φFB. The source follower includes a MOS transistor 221 and a constant current source 225. A constant voltage VGR resets the CT 228 and the gate of the MOS transistor 221. A switch MOS transistor 223 for resetting is on/off-controlled by the signal φGR. The constant voltage VGR is given by VGR=VRS+Vth, where Vth is the threshold voltage of the MOS transistor 221. A switch MOS transistor 222 for resetting the PD 116 and the CM$_1$ 335 and the CM$_2$ 445 by using the constant voltage VRS is on/off-controlled by a signal φRS. The device sequentially reads out, to the output line, optical signals as inverting amplifier outputs from the memory cell unit by turning on/off a MOS transistor 224 by using a shift pulse φH from a shift register. Each optical signal is finally output to an output node 202 via a buffer amplifier 204. The transfer circuit unit 201 is connected to the common output line 102 to hold signals from the common output line 102 in the CT 228 and transfer them.

Figure 3A:
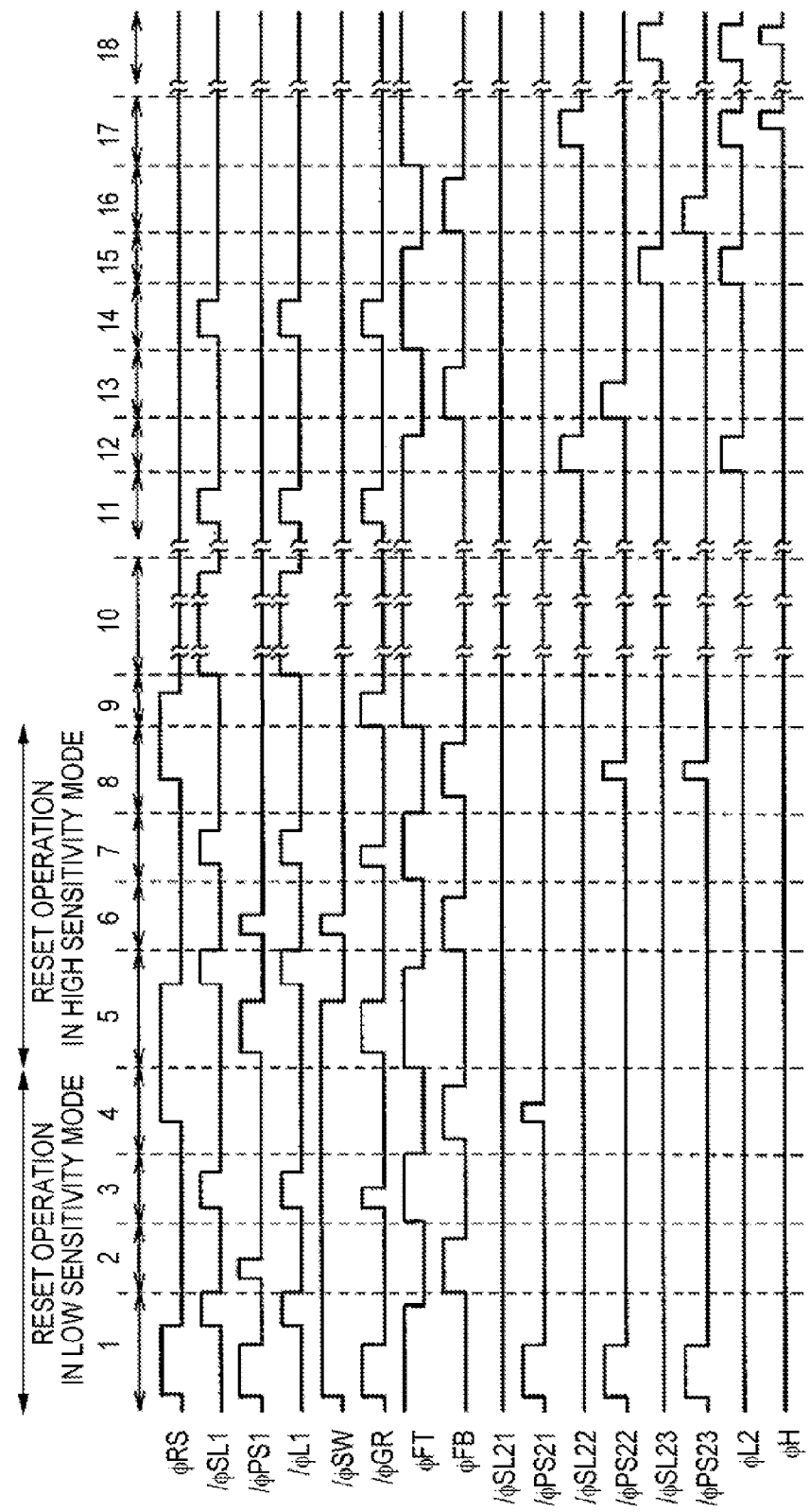
FIGS. 3A and 3B are driving timing charts of the photoelectric conversion device in FIG. 2.
Figure 3B:
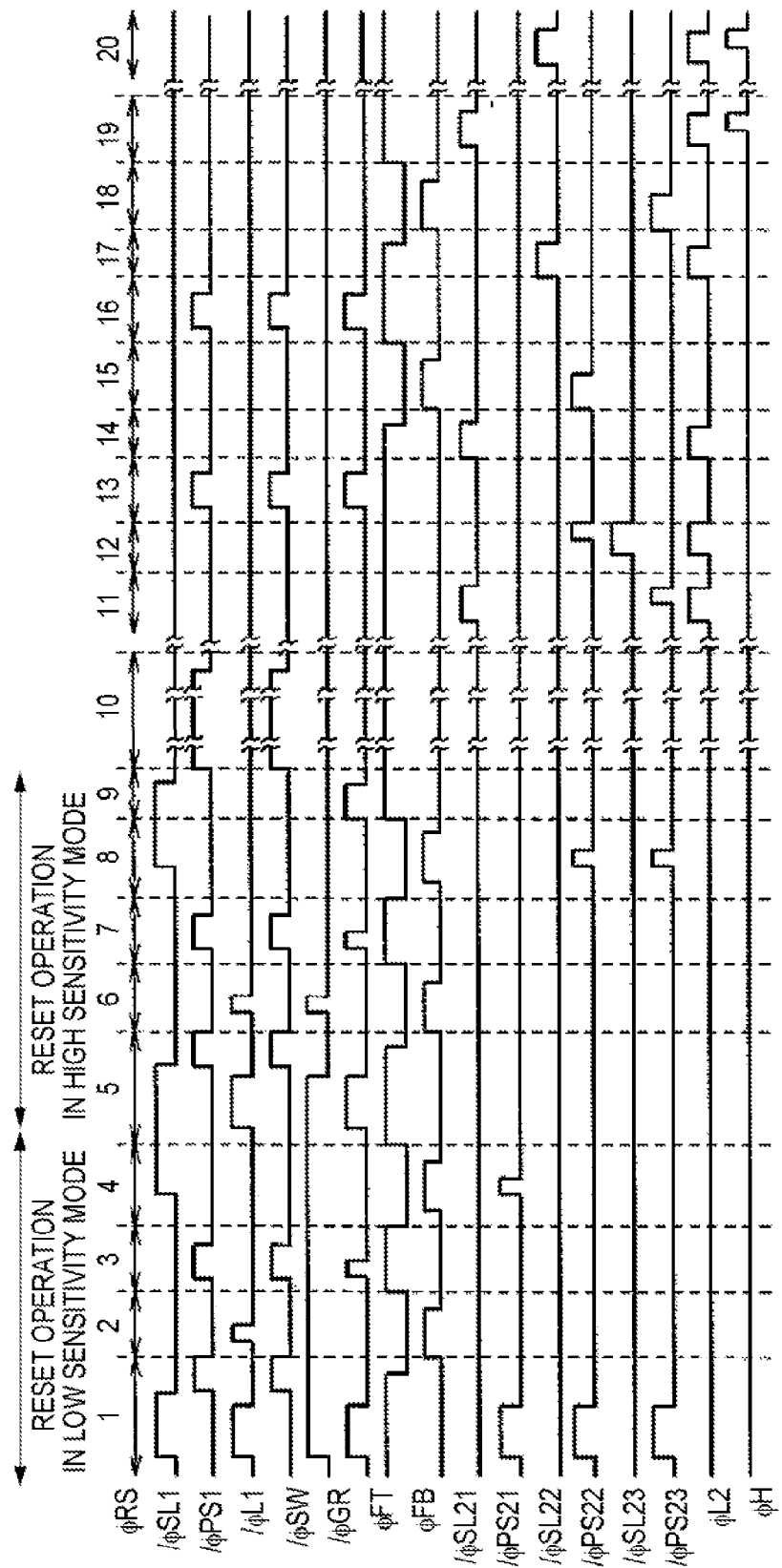

FIGS. 3A and 3B are driving timing charts showing the operation of the photoelectric conversion device in FIG. 2. A signal input to each PMOS transistor which is written with "/" (bar) as a signal representation indicates that the signal is enabled at high level. FIG. 3A shows operation in the high sensitivity mode. FIG. 3B shows operation in the low sensitivity mode. The operations in FIGS. 3A and 3B are common from period (1) to period (10). The operation of the circuit in FIG. 2 will be described with reference to the driving timing charts of FIGS. 3A and 3B.

In period (1), first of all, the device sets /φSW to high level, and sets the signals φRS and φFT and /φPS1, /φPS21, /φPS22, and /φPS23 to high level to set the low sensitivity mode. This resets the PD 116 of the sensor cell unit 101, the CM$_1$ 335 of the first memory cell unit 301, the CM$_2$ 445 of the second memory cell unit 401, and the CM$_3$ 545 of the third memory cell unit 501. At the same time, the device resets the CT 228 by setting /φGR, which is the reverse-phase signal of the signal φGR, to high level.

The device sets signals φRS and /φGR and /φPS1, /φPS21, /φPS22, and /φPS23 to low level, and then sets /φSL1, which is the reverse-phase signal of the signal φSL1, and /φL1, which is the reverse-phase signal of the signal φL1, to high level. With this operation, the device reads out sensor noise after resetting of the sensor cell unit 101 to the common output line 102 and writes the noise in the CT 228. The device sets the signal φFT to low level at the end of writing. The sensor noise at this time is represented by Ns1.

In period (2), the potential input to the gate of the MOS transistor 221 is represented by VGR+Ns1. The device sets the signal φFB to high level to output the potential VRS+Ns1 to the common output line 102 via the source follower. Immediately after this operation, the device sets the signal φPS1 to high level to input noise (Ns1+Nt$_L$) obtained by adding noise Nt$_L$ from the transfer circuit unit 201 to the sensor noise Ns1 as a noise level to the sensor cell unit 101.

In period (3), the device sets the signal φFT to high level, and then sets the signals /φL1 SL1 and /φL1 for operating the inverting amplifier of the sensor cell unit 101 to high level. With this operation, the sensor cell unit 101 outputs the signal obtained by adding Ns1 to the inverting amplifier output −(Ns1+Nt$_L$), that is, −Nt$_L$. At this time, since /φGR is set to high level, the CT 228 holds the signal VGR+Nt$_L$. The device further sets /φGR to low level to set one electrode of the CT 228 in a floating state.

In period (4), the device sets the signal φFB to high level, and then sets the signal φRS and the signal PS21 for writing noise in the CM$_1$ 335 to high level. The electrode of the transfer capacitor (CT) 228 which is located on the common output line 102 side is set at the potential VRS and varies by an amount corresponding to the noise Nt$_L$, and hence the potential of the other electrode of the transfer capacitor (CT) 228 also varies by an amount corresponding to Nt$_L$. With this operation, the noise output from the source follower and input to the first memory cell unit 301 becomes 2Nt$_L$. In this period, the noise at the time of low sensitivity is written in the CM$_1$ 335 of the first memory cell unit 301. That is, in the low sensitivity mode, the first memory cell unit 301 writes the reset noise signal originating from the resetting of the PD 116, CT 228, CM$_1$ 335, CM$_2$ 445, and CM$_3$ 545 in the first memory capacitor (CM$_1$) 335.

In period (5), the device resets the sensor cell unit 101 by setting the signals ϕRS, ϕFT, and /ϕPS1 to high level. At the same time, the device also resets the CT 228 by setting /ϕGR, which is the reverse-phase signal of the signal ϕGR, to high level.

Let Ns2 be the sensor noise determined when the device sets /ϕSW to low level to set the high sensitivity mode, and then sets the signal ϕRS, /ϕGR, and /ϕPS1 to low level. The noise Ns2 is the noise when Cpd and the CP 117 are not connected in parallel. The device sets the signals /ϕL1 SL1 and /ϕL1 to high level to read out the sensor noise Ns2 from the sensor cell unit 101 to the common output line 102 and write the noise in the CT 228. At the end of writing, the device sets the signal ϕFT to low level.

In period (6), the potential input to the gate of the MOS transistor 221 is represented by VGR+Ns2. The device sets the signal ϕFB to high level to output the potential VRS+Ns2 to the common output line 102 via the source follower. Immediately after this operation, the device sets the signal /ϕPS1 to high level to input noise (Ns2+Nt$_H$) obtained by adding noise Nt$_H$ from the transfer circuit unit 201 to the sensor noise Ns2 as a noise level to the sensor cell unit 101.

In period (7), the device sets the signal ϕFT to high level, and sets the signals /ϕL1 SL1 and /ϕL1 for operating the inverting amplifier of the sensor cell unit 101 to high level. With this operation, the sensor cell unit 101 outputs the signal obtained by adding Ns2 to the inverting amplifier output −(Ns2+Nt), that is, −Nt$_H$. At this time, since /ϕGR is set to high level, the CT 228 holds the signal VGR+Nt$_H$. The device further sets /ϕGR to low level to set one electrode of the CT 228 in a floating state.

In period (8), the device sets the signals ϕFB and ϕRS to high level, and sets the signals OPS22 and OPS23 for writing noise in the CM$_2$ 445 and the CM$_3$ 545 to high level. As a result, the electrode of the CT 228 which is located on the common output line 102 side is set at the potential VRS and varies by an amount corresponding to the noise Nt$_H$, and hence the potential of the other electrode of the CT 228 also varies by an amount corresponding to Nt$_H$. With this operation, the noise output from the source follower and simultaneously input to the second memory cell unit 401 and the third memory cell unit 501 becomes 2Nt$_H$. In this period, the noise at the time of high sensitivity is simultaneously written in the CM$_2$ 445 of the second memory cell unit 401 and the CM$_3$ 545 of the third memory cell unit 501. That is, in the high sensitivity mode, the second memory cell unit 401 writes, in the second memory capacitor (CM$_2$) 445, the reset noise signal originating from the resetting of the PD 116, CT 228, CM$_1$ 335, CM$_2$ 445, and CM$_3$ 545. In the high sensitivity mode, the third memory cell unit 501 writes, in the third memory capacitor (CM$_3$) 545, the reset noise signal originating from the resetting of the PD 116, CT 228, CM$_1$ 335, CM$_2$ 445, and CM$_3$ 545.

In period (9), the sensor cell unit 101 enters an optical accumulation operation period, and performs real-time AGC operation of controlling an output set gain by monitoring an optical signal in real time. Let S$_1$ be an optical signal accumulated in the sensor cell unit 101. Operation during a real-time AGC period will be described below.

The sensor cell unit 101 sets the signal /ϕGR for fixing the input of the source follower to the constant voltage VGR and the signal ϕFT for fixing the common output line 102 to the constant voltage VRS to high level, maintains the signal ϕRS at high level, and sets the potentials of the two electrodes of the CT 228 to the constant voltages VGR and VRS, respectively. The sensor cell unit 101 also sets the signal /ϕGR to low level to set the other electrode of the CT 228 in a floating state.

In period (10), the device then sets the signals /ϕL1 SL1 and /ϕL1 to high level to add the sensor noise Ns2 to an inverted output −(S$_1$+Ns2+Nt$_H$) from the sensor cell unit 101. As a result, −(S$_1$+Nt$_H$) is output to the transfer circuit unit 201. Since the potential of the CT 228 on the common output line 102 side varies by an amount corresponding to −(S$_1$+Nt$_H$), the other electrode of the CT 228 is set at VGR−(S$_1$+Nt$_H$). When the transfer circuit unit 201 outputs a signal, the noise Nt$_H$ from the transfer circuit unit 201 is added to the signal. Therefore, the transfer circuit unit 201 outputs an optical signal −S$_1$ from an output node 203. With the above operation, the device performs real-time AGC by monitoring the optical signal −S$_1$. In real-time AGC, the device detects the maximum and minimum values of an optical signal to set an optimal gain for an optical output.

The photoelectric conversion device in FIG. 2 is used as a photoelectric conversion device which performs phase difference type auto focus. For example, the photoelectric conversion device is used as an auto focus photoelectric conversion device (AF sensor) used for a digital single-lens reflex camera or the like. When performing focus detection, the AF sensor is required to detect a contrast and provide position information indicating to which bit the peak of the contrast corresponds. It is possible to detect a contrast by detecting a maximum value (peak: PEAK) and a minimum value (bottom: BTM) and calculating their difference.

FIG. 4 is a circuit diagram for explaining maximum and minimum value detection circuits. Reference numerals 31 and 32 denote a maximum value detection circuit and a minimum value detection circuit, respectively. Optical signals from a plurality of sensor cell units 101 are input to amplifiers 314 to 316. Referring to FIG. 4, optical signals 311 to 313 corresponding to three pixels are respectively input the amplifiers 314 to 316 of the maximum value detection circuit 31, and are simultaneously input to amplifiers 324 to 326 of the minimum value detection circuit 32. In the maximum value detection circuit 31, an NMOS source follower having one constant current source load 319 for NMOS transistors 341 to 343 which receive output signals from the amplifiers 314 to 316 at the gates performs maximum value detection, and outputs the maximum value as a PEAK output 318. Meanwhile, in the minimum value detection circuit 32, a PMOS source follower having one constant current source load 329 for PMOS transistors 351 to 353 which receive output signals from the amplifiers 324 to 326 at the gates performs minimum value detection, and outputs the minimum value as a BTM output 328. As an accumulation control area at this time, only the area turned on by AGC control selection switches 317 and 327 is selected. The maximum value detection signal and the minimum value detection signal compared in the selected range are output.

Figure 5:
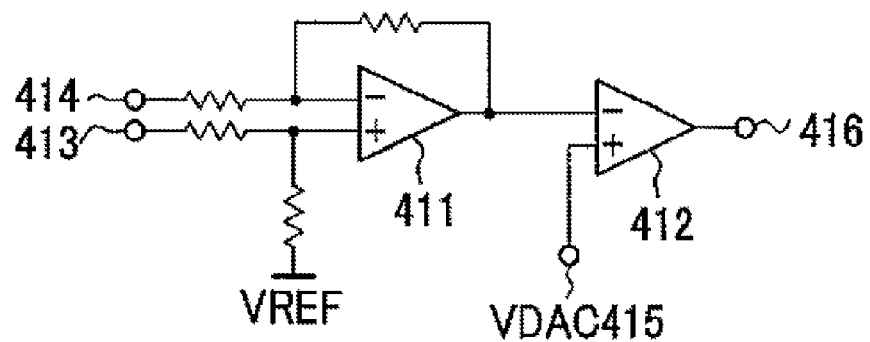
FIG. 5 is a schematic circuit diagram of a PB comparator in the first embodiment.

FIG. 5 is a schematic circuit diagram of a comparator (PB comparator) for extracting a difference signal PB between the maximum value (PEAK) detection signal and the minimum (BTM) detection signal. The signals respectively obtained by maximum value detection and minimum value detection are respectively input as a PEAK 413 and a BTM 414 to the non-inverting and inverting inputs of a differential amplifier 411. A comparator 412 compares the output signal (difference signal) PB from the differential amplifier 411 with a constant voltage VDAC 415 set by a digital/analog (DA) converter (not shown), thereby performing accumulation end determination at an inverted output 416. The inverted output 416 will be referred to as a PB inverted signal. In this case, the value of the VDAC 415 can be changed to, for example, 1.6 V, 0.8 V, 0.4 V, and 0.2 V in correspondence with gain set values of ×5, ×10, ×20, and ×40 of the AGC.

Note that it is not always possible to perform the above contrast detection with respect to objects in nature. This is because, some objects exhibit low contrast under high luminance, and other objects exhibit low contrast under low luminance. In such cases, it is necessary to perform accumulation end determination. For the former objects, an accumulation end is determined when an optical signal reaches a saturation cutoff voltage. For the latter objects, since a sufficient optical signal cannot be obtained, accumulation is forcibly terminated in a predetermined period of time.

Figure 6:
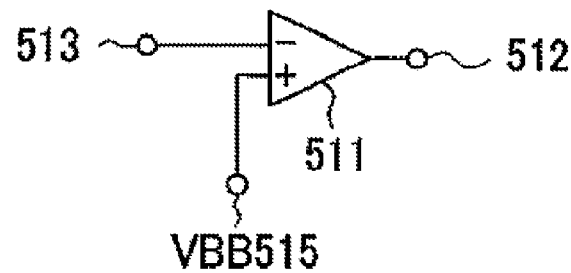
FIG. 6 is a schematic circuit diagram of a PK comparator in the first embodiment.

FIG. 6 is a view showing a PK comparator which outputs an inverted signal when an optical signal reaches a saturation cutoff voltage. This device performs accumulation end determination by monitoring an inverted output 512 from a comparator 511 which compares a maximum detection signal (PEAK) 513 with a saturation cutoff voltage (VBB) 515. The inverted output 512 will be referred to as a PK inverted signal.

Figure 7A:
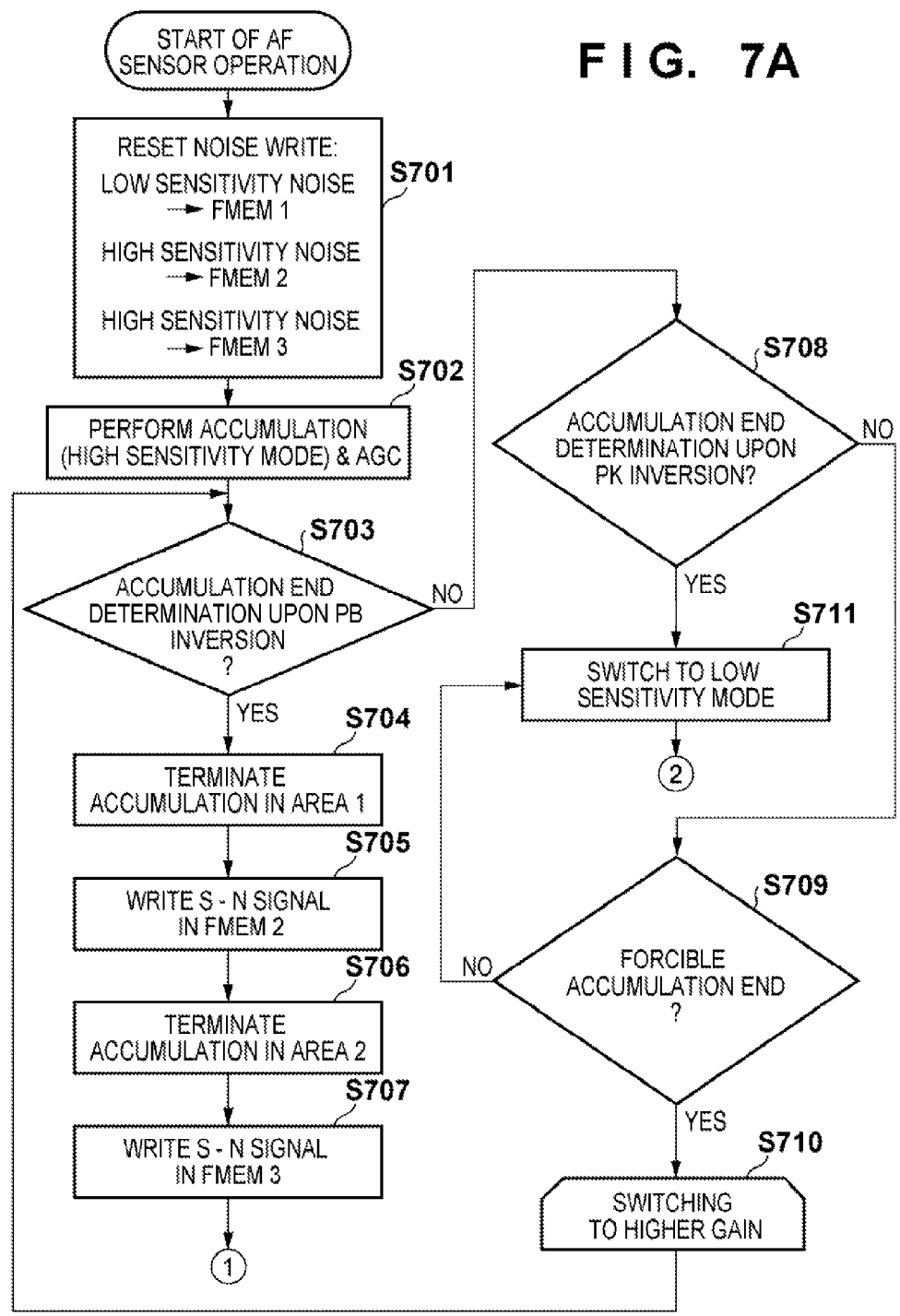
FIGS. 7A and 7B show an operation flowchart in the first embodiment.
Figure 7B:
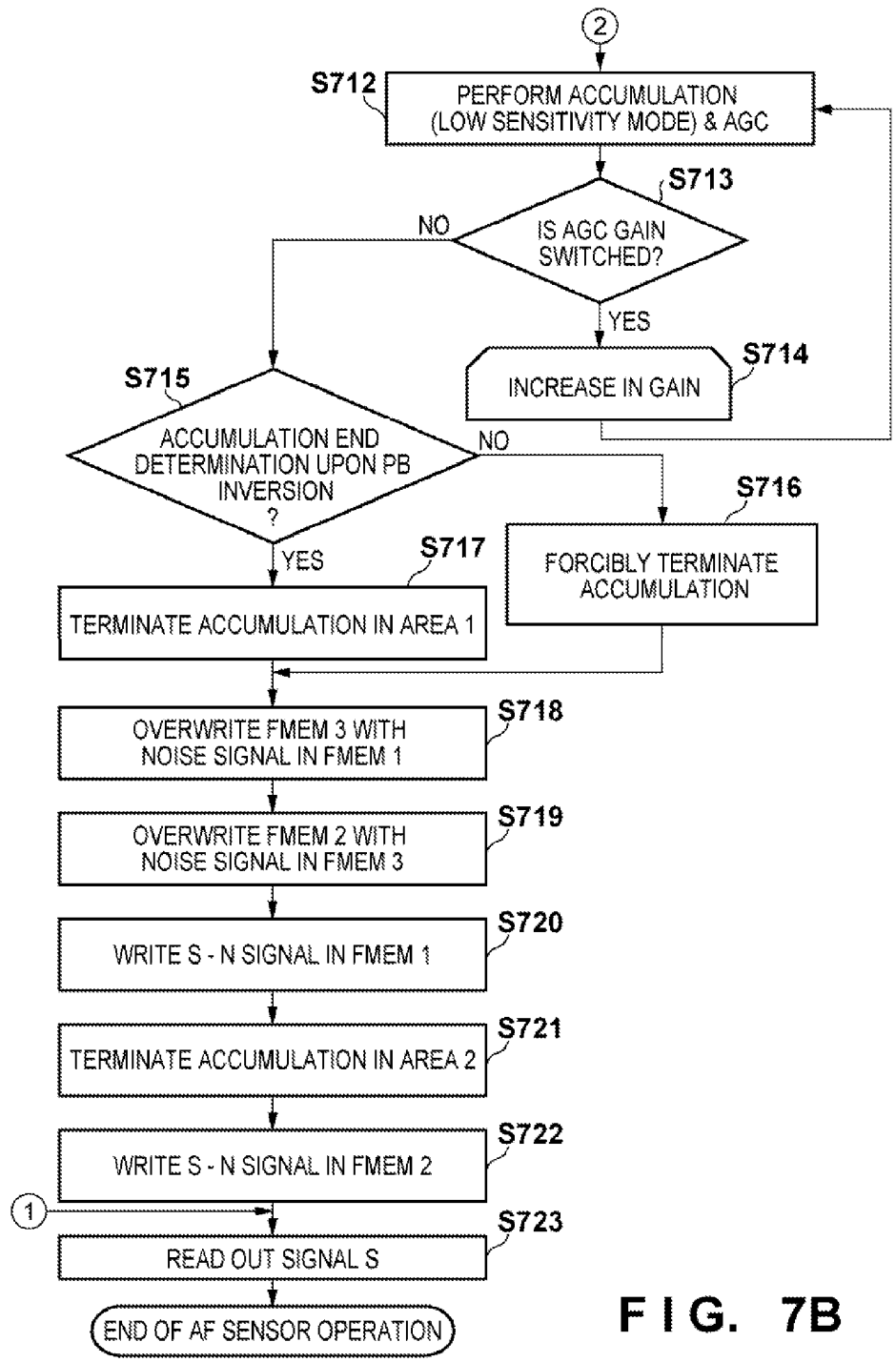

FIGS. 7A and 7b show an operation flowchart for accumulation end determination. When the AF sensor starts, the device writes reset noise in step S701. The device performs reset noise writing operation in the same manner as that described with reference to the driving timing chart of FIG. 2. FMEMs 1, 2, and 3 respectively correspond to a group of the first memory cell units 301, a group of the second memory cell units 401, and a group of the third memory cell units 501. The device writes reset noise in the low sensitivity mode in FMEM 1, and simultaneously writes reset noise in the high sensitivity mode in FMEMs 2 and 3.

In step S702, the device starts accumulation in the high sensitivity mode with a low magnification gain of ×5. Assume that accumulation control areas subjected to accumulation monitoring are AREA 1 and AREA 2. AREA 1 and AREA 2 are areas obtained by dividing one line sensor in correspondence with a plurality of AF measurement points. In steps S703 and S704, if the device can obtain a satisfactory contrast image by accumulation monitoring in AREA 1, the device obtains a PB inverted signal. At this time point, therefore, the device determines an accumulation end, and terminates the accumulation. In step S705, the device performs noise removing operation (S−N) for an optical signal in the accumulation control area having undergone accumulation, and writes the resultant signal in a frame memory. This operation will be described later. In the operation flowchart, the S−N signal is written in FMEM 2. In step S706, likewise, if the device obtains a satisfactory contrast image by accumulation monitoring in AREA 2, the device obtains a PB inverted signal. At this time point, therefore, the device determines an accumulation end, and terminates the accumulation. In step S707, likewise, the device performs noise removing operation (S−N), and writes the S−N signal in FMEM 3. Finally, in step S723, the device reads out the S−N signal as the signal S.

Assume that the device can obtain neither a PB inverted signal nor a PK inverted signal in steps S708 and S709 in an environment of low luminance and low contrast. In this case, the device forcibly terminates the accumulation in a predetermined period of time in step S709, and then switches to a higher gain in step S710. The process then returns to step S702. Finally, in step S703, upon obtaining a PB inverted signal, the device determines an accumulation end. Likewise, in step S704, the device terminates the accumulation in AREA 1 in step S704. In step S705, the device performs noise removing operation (S−N) and writes the S−N signal in FMEM 2. In step S706, likewise, upon obtaining a satisfactory contrast image by accumulation monitoring in AREA 2, the device obtains a PB inverted signal. At this time point, therefore, the device determines an accumulation end, and terminates the accumulation. In step S707, likewise, the device performs noise removing operation (S−N), and writes the S−N signal in FMEM 3. Finally, in step S723, the device reads out the S−N signal as the signal S.

The point associated with overwriting operation from FMEM 1 to FMEM 2 in this embodiment will be clarified here. In an environment of high luminance and low contrast, since the device can obtain a PK inverted signal in step S708 although no PB inversion occurs in step S703, and hence switches to the low sensitivity mode in step S711. In step S712, the device starts accumulation in the low sensitivity mode. When switching the AGC gain in step S713, the device increases the gain in step S714. The process then returns to step S712. In the low sensitivity mode, the device can obtain a satisfactory contrast image because the device can spend a certain accumulation time even under high luminance. For this reason, in step S715, the device obtains a PB inverted signal and determines an accumulation end. The device then terminates the accumulation. Upon PB inversion, the device terminates the accumulation in step S717 in AREA 1. If no PB inversion has occurred, the device forcibly terminates the accumulation in step S716. In this case, AREA 1 is an accumulation control area which has been subjected to accumulation monitoring. In order to perform readout operation with a high S/N ratio in the low sensitivity mode even in AREA 2 so as to increase the number of AF measurement points, it is necessary to overwrite FMEM 2 with the reset noise signal in FMEM 1. This is because the reset noise in the low sensitivity mode is written in FMEM 1, and the reset noise in the high sensitivity mode is written in FMEMs 2 and 3 at the start of accumulation. According to this embodiment, overwriting FMEM 2 with the reset noise in the low sensitivity mode can increase the number of AF measurement points without increasing the number of memory cell units. In step S718, the device overwrites FMEM 3 with the noise signal in FMEM 1. In step S719, the device overwrites FMEM 2 with the noise signal in FMEM 3. In the operation flowchart, the reason why the device overwrites FMEM 2 through FMEM 3 is that the amplification gains of the inverting amplifiers in the first to third memory cell units 301, 401, and 501 are −1. That is, when reading out the S−N signal as the signal S from FMEM 2, the device needs to hold the noise signal with the negative sign in FMEM 3 to subtract the noise signal. Thereafter, in step S720, the device performs noise removing operation (S−N), and writes the S−N signal in FMEM 1. In step S721, likewise, upon obtaining a satisfactory contrast image by accumulation monitoring in AREA 2, the device obtains a PB inverted signal. At this time point, therefore, the device determines an accumulation end, and terminates the accumulation. Thereafter, in step S722, the device performs noise removing operation (S−N), and writes the S−N signal in FMEM 2. Finally, in step S723, the device reads out the S−N signal as the signal S. The device then terminates the operation.

Readout operation in the high sensitivity mode will be described by referring back to the timing chart of FIG. 3A.

In period (11), the device obtains an optical signal $-S_{21}$ after the end of the optical accumulation operation period in AREA 1, and then sets the signals /φSL1, /φL1, and /φGR to high level. The other electrode of the CT 228 is then fixed to the constant voltage VRG, and the potential of the electrode of the CT 228 on the common output line 102 side varies by an amount corresponding to $-(S_{21}+Nt_H)$.

In period (12), the device sets /φSL22, which is the reverse-phase signal of the signal φSL22, and the signal /φL2 to high level to read out the noise $2Nt_H$ accumulated in the second memory cell unit 401 via the inverting amplifier. Since noise Nm2 from the second memory cell unit 401 is added to this signal, the device reads out $-2Nt_H+Nm2$ at the electrode of the CT 228 on the common output line 102 side. In this case, the device has written, in the CT 228, a potential variation amount corresponding to $-2Nt_H+Nm2-(-(S_{21}+Nt_H))=S_{21}-Nt_H+Nm2$.

In period (13), the device sets the signal φFT to low level, sets the signal φFB to high level, and sets the signals φFB and PS22 to high level. The device writes $S_{21}+Nm3$ in the $CM_2$ 445 of the second memory cell unit 401 upon adding the noise $Nt_H$ from the transfer circuit unit 201.

In period (14), the device obtains an optical signal $-S_{22}$ after the end of the optical accumulation operation period in AREA 2, and then sets the signals /φSL1, /φL1, and /φGR to high level. The other electrode of the CT 228 is then fixed to the constant voltage VRG, and the potential of the electrode of the CT 228 on the common output line 102 side varies by an amount corresponding to $-(S_{22}+Nt_H)$.

In period (15), the device sets /φSL22, which is the reverse-phase signal of the signal φSL22, and the signal /φL2 to high level to read out the noise $2Nt_H$ accumulated in the third memory cell unit 501 via the inverting amplifier. Since the noise Nm3 from the third memory cell unit 501 is added to this signal, the device reads out $-2NtH+Nm3$ at the electrode of the CT 228 on the common output line 102 side. In this case, the device has written, in the CT 228, a potential variation amount corresponding to $-2Nt_H+Nm3-(-(S_{22}+Nt_H))=S_{22}-Nt_H+Nm3$.

In period (16), the device sets the signal φFT to low level, sets the signal φFB to high level, and sets the signals φFB and φPS23 to high level. The device then writes $S_2+Nm3$ in the $CM_3$ 545 of the third memory cell unit 501 upon adding the noise $Nt_H$ from the transfer circuit unit 201.

In period (17), the device performs the readout operation of the second memory cell unit 401. The device sets the signal φFB to low level, and sets the signals /φSL22 and /φL2 for operating the inverting amplifier of the second memory cell unit 401 and the signal φFT for electrically connecting the common output line 102 and the MOS transistor 224 to high level. The device adds the noise Nm2 from the second memory cell unit 401 to the inverted signal $-(S_{21}+Nm2)$ from the second memory cell unit 401, and finally outputs $-S_{21}$ from which a noise component has been removed. The device sequentially reads out the signals for each column by setting a signal φH to high level.

Likewise, in period (18), the device performs the readout operation of the third memory cell unit 501. The device sets the signal φFB to low level, and sets the signals /φSL23 and /φL2 for operating the inverting amplifier of the third memory cell unit 501 and the signal φFT for electrically connecting the common output line 102 and the MOS transistor 224 to high level. The device adds the noise Nm3 from the third memory cell unit 501 to an inverted signal $-(S_{22}+Nm3)$ from the third memory cell unit 501, and finally outputs $-S_{22}$ from which a noise component has been removed. The device sequentially reads out the signals for each column by setting the signal φH to high level.

Noise removing operation and readout operation in the low sensitivity mode will be described with reference to FIG. 3B. Operation after the timings in period (11) and the subsequent periods is important in terms of increasing the number of AF measurement points in this embodiment. Operation in the low sensitivity mode will be described below.

In period (11), the device sets the signals /φSL21 and /φL2 to high level to drive the inverting amplifier in order to overwrite the third memory cell unit 501 with the reset noise $2Nt_L$ held in the first memory cell unit 301 in the low sensitivity mode. Thereafter, the device sets the write switch signal /φPS23 to high level. At this time, the device writes $-2Nt_L+Nm1$ in the $CM_3$ 545 of the third memory cell unit 501 upon adding noise Nm1 from the first memory cell unit 301. Note that at this time, since the amplification gain of the inverting amplifier is $-1$, the reset noise signal written in the $CM_3$ 545 of the third memory cell unit 501 has a negative sign. That is, in the low sensitivity mode, the third memory cell unit 501 writes, in the third memory capacitor ($CM_3$) 545, the reset noise signal obtained by making the first memory cell unit 301 invert and amplify the reset noise signal written in the first memory capacitor ($CM_1$) 335.

In period (12), the device sets the signals /φSL23 and /φL2 for overwriting the second memory cell unit 401 with the noise signal held in the third memory cell unit 501 again to high level to drive the inverting amplifier, and then sets the write switch signal /φPS22 to high level. Since the first to third memory cell units have the same layout, the noise Nm generated in each memory cell unit can be regarded as Nm1≈Nm2≈Nm3. For this reason, the noise signal output from the third memory cell unit 501 via the inverting amplifier becomes $-(-2Nt_L+Nm1)+Nm3$, and the device writes $2Nt_L$ in the $CM_2$ 445 of the second memory cell unit 401. The reset noise signal written in this case is multiplied again by a gain of $-1$, and hence becomes the same reset noise signal in the first memory cell unit 301. The second memory cell unit 401 writes, in the second memory capacitor ($CM_2$) 445, the reset noise signal obtained by making the third memory cell unit 501 invert and amplify the reset noise signal written in the third memory capacitor ($CM_3$) 545.

In period (13), the device obtains an optical signal $-S_{31}$ after the end of the optical accumulation operation period in AREA 1, and then sets the signals /φSL1, /φL1, and /φGR to high level. The sensor cell unit 101 then outputs the signal $-S_{31}$ to the common output line 102. The other electrode of the CT 228 is fixed to the constant voltage VRG, and the potential of the electrode of the CT 228 on the common output line 102 side varies from the potential VRS by an amount corresponding to $-(S_{31}+Nt_L)$.

In period (14), the device sets /φSL21, which is the reverse-phase signal of the signal φSL21, and the signal /φL2 to high level to read out the noise $2Nt_L$ accumulated in the first memory cell unit 301 via the inverting amplifier. That is, the first memory cell unit 301 inverts and amplifies the reset noise signal $2Nt_L$ written in the $CM_1$ 335 and outputs the resultant signal to the common output line 102. The noise Nm1 from the first memory cell unit 301 is added to this signal. As a result, the device reads out $-2Nt_L+Nm1$ at the electrode of the CT 228 on the common output line 102 side. In this case, the device writes a potential variation amount corresponding to $-2Nt_L+Nm1-(-(S_{31}+Nt_L))=S_{31}-Nt_L+Nm1$ in the CT 228. That is, the transfer circuit unit 201 writes, in the CT 228, the signal obtained by adding the signal obtained by making the first memory cell unit 301 invert and amplify the reset noise signal written in the $CM_1$ 335 to the signal output from the sensor cell unit 101.

In period (15), the device sets the signal φFT to low level, sets the signal φFB to high level, and sets the signals φFB and /φPS21 to high level. The device then writes $S_{31}+Nm1$ in the $CM_1$ 335 of the first memory cell unit 301 upon adding the noise $Nt_L$ from the transfer circuit unit 201. That is, the first memory cell unit 301 writes, in the first memory capacitor ($CM_1$) 335, the addition signal written in the CT 228 of the transfer circuit unit 201.

In period (16), the device obtains an optical signal $-S_{32}$ after the end of the optical accumulation operation period in AREA 2, and then sets the signals /ϕSL1, /ϕL1, and /ϕGR to high level. The sensor cell unit 101 then outputs the signal $-S_{32}$ to the common output line 102. The other electrode of the CT 228 is fixed to the constant voltage VRG, and the potential of the electrode of the CT 228 on the common output line 102 side varies from the potential VRS by an amount corresponding to $-(S_{32}+Nt_L)$.

In period (17), the device sets /ϕSL22, which is the reverse-phase signal of the signal ϕSL22, and the signal /ϕL2 to high level to read out the noise $2Nt_L$ accumulated in the second memory cell unit 401 via the inverting amplifier. That is, the second memory cell unit 401 inverts and amplifies the reset noise signal $2Nt_L$ written in the $CM_2$ 445 and outputs the resultant signal to the common output line 102. The noise Nm2 from the second memory cell unit 401 is added to this reset noise signal. As a result, the device reads out $-2Nt_L+Nm2$ at the electrode of the CT 228 on the common output line 102 side. In this case, the device writes a potential variation amount corresponding to $-2Nt_L+Nm2-(-(S_{32}+Nt_L))= S_{32}-Nt_L+Nm2$ in the CT 228. That is, the transfer circuit unit 201 writes, in the CT 228, the signal obtained by adding the signal obtained by making the second memory cell unit 401 invert and amplify the reset noise signal written in the $CM_2$ 445 to the signal output from the sensor cell unit 101.

In period (18), the device sets the signal ϕFT to low level, sets the signal ϕFB to high level, and sets the signals ϕFB and /ϕPS22 to high level. The device then writes $S_{32}+Nm2$ in the $CM_2$ 445 of the second memory cell unit 401 upon adding the noise $Nt_L$ from the transfer circuit unit 201. That is, the second memory cell unit 401 writes, in the second memory capacitor ($CM_2$) 445, the addition signal written in the CT 228 of the transfer circuit unit 201.

In period (19), the device performs the readout operation of the first memory cell unit 301. The device sets the signal ϕFB to low level, and sets the signals /ϕSL21 and /ϕL2 for operating the inverting amplifier of the first memory cell unit 301 and the signal ϕFT for electrically connecting the common output line 102 and the MOS transistor 224 to high level. The device adds the noise Nm1 from the first memory cell unit 301 to an inverted signal $-(S_{31}+Nm1Nm1)$ from the first memory cell unit 301, and finally outputs $-S_{31}$ from which a noise component has been removed. The device sequentially reads out the signals for each column by setting the signal ϕH to high level.

Likewise, in period (20), the device performs the readout operation of the second memory cell unit 401. The device sets the signal ϕFB to low level, and sets the signals /ϕSL22 and /ϕL2 for operating the inverting amplifier of the second memory cell unit 401 and the signal ϕFT for electrically connecting the common output line 102 and the MOS transistor 224 to high level. The device adds the noise Nm2 from the second memory cell unit 401 to an inverted signal $-(S_{32}+Nm2)$ from the second memory cell unit 401, and finally outputs $-S_{32}$ from which a noise component has been removed. The device sequentially reads out the signals for each column by setting the signal ϕH to high level.

As described above, providing at least the three memory cell units 301, 401, and 501 for one sensor cell unit 101 can increase the number of measurement points in the high sensitivity mode and the low sensitivity mode. Obviously, in addition to the above effect, it is possible to obtain signals with high S/N ratios having wide dynamic ranges by switching between the high sensitivity mode and the low sensitivity mode. In addition, this device shifts to the low sensitivity mode without performing accumulation again in real-time AGC operation upon determining that the device is under a high luminance condition, and hence it is possible to shorten the time required for focus detection. The embodiment can both shorten the time required for focus detection and increase the dynamic range.

(Second Embodiment)

Figure 8:
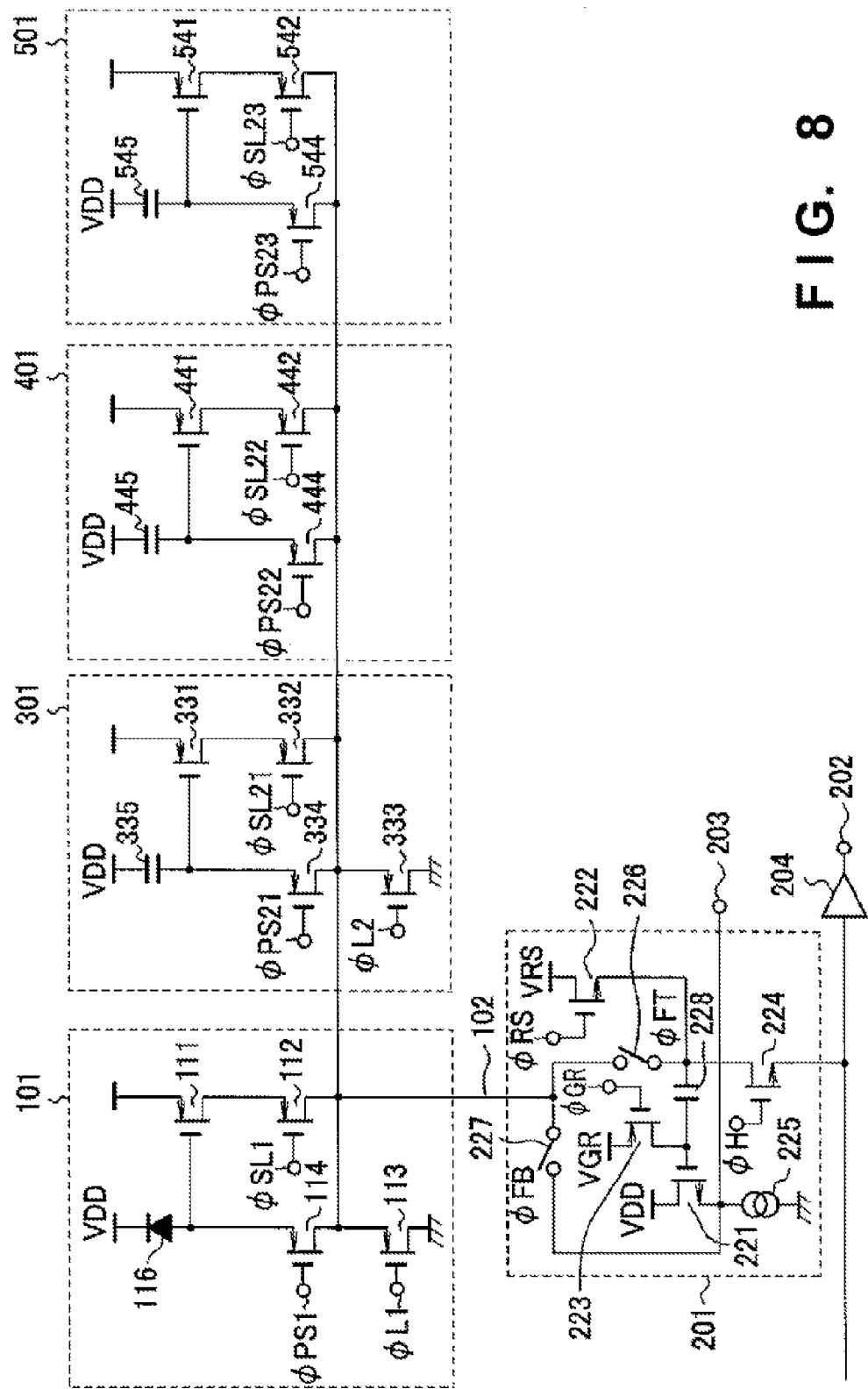
FIG. 8 is a circuit diagram of a photoelectric conversion device according to the second embodiment of the present invention.

FIG. 8 is a circuit diagram showing the arrangement of a photoelectric conversion device according to the second embodiment of the present invention. Referring to FIG. 8, a sensor cell unit 101 and a transfer circuit unit 201 each are connected to a common output line 102, together with a first memory cell unit 301, a second memory cell unit 401, and a third memory cell unit 501. In this embodiment, three memory cell units are provided in correspondence with one sensor cell unit. In addition, this device includes a plurality of sensor cell units and memory cell units, which can function as an area sensor. FIG. 8 omits the illustration of the sensitivity switching function described in the first embodiment. For this reason, the device does not include a MOS transistor 115 corresponding to the sensitivity switch in FIG. 1. Each of the blocks of the sensor cell unit 101, first memory cell unit 301, second memory cell unit 401, third memory cell unit 501, and transfer circuit unit 201 has the same function as in the first embodiment, and hence a description of them will be omitted.

Figure 9:
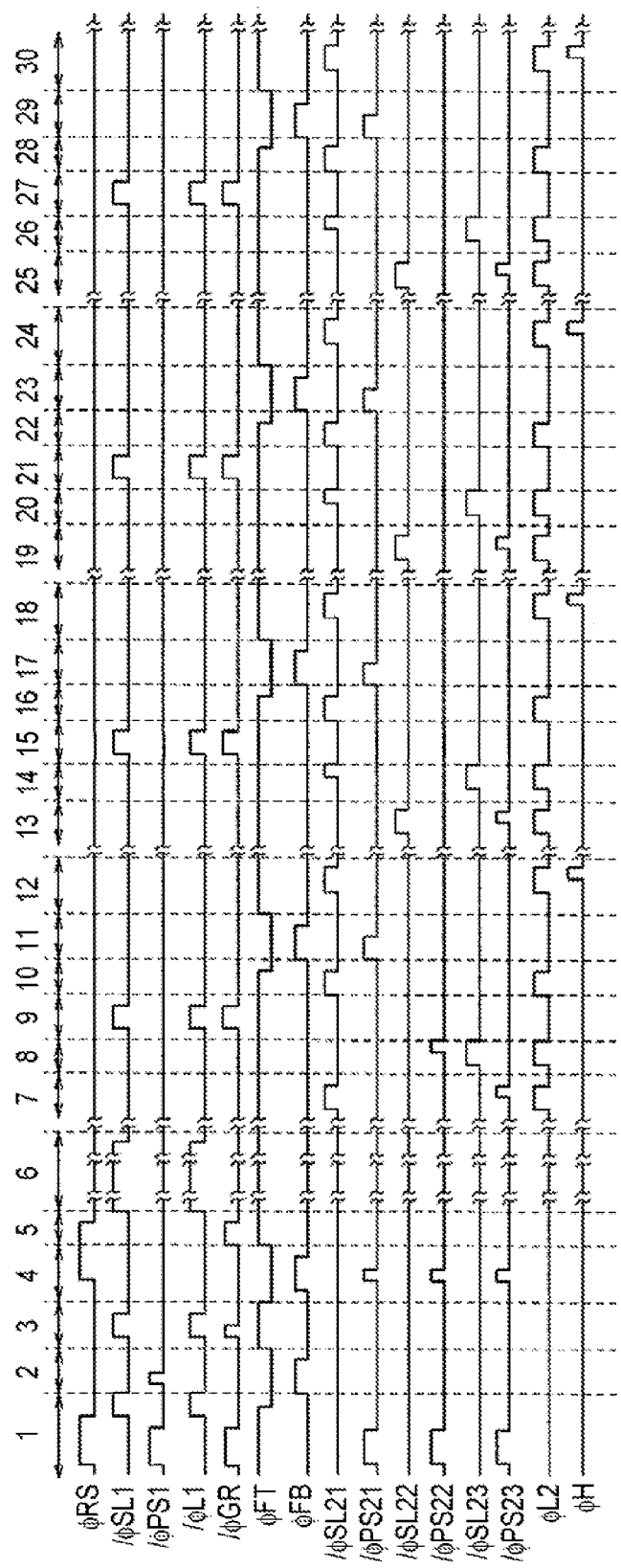
FIG. 9 is a driving timing chart of the photoelectric conversion device in FIG. 8.

FIG. 9 is a driving timing chart showing the operation of the photoelectric conversion device in FIG. 8. The operation of the circuit in FIG. 8 will be described with reference to the timing chart of FIG. 9. A signal input to each PMOS transistor in FIG. 9 which is written with "/" (bar) as a signal representation indicates that the signal conducts at high level.

In period (1), the device sets signals ϕRS, ϕFT, /ϕPS1, /ϕPS21, /ϕPS22, and /ϕPS23 to high level. This resets a PD 116 of the sensor cell unit 101, a $CM_1$ 335 of the first memory cell unit 301, a $CM_2$ 445 of the second memory cell unit 401, and a $CM_3$ 545 of the third memory cell unit 501. At the same time, the device resets a CT 228 by setting /ϕRG, which is the reverse-phase signal of a signal ϕGR, to high level.

Subsequently, the device sets the signals ϕRS, /ϕGR, /ϕPS1, /ϕPS21, /ϕPS22, and /ϕPS23 to low level, and then sets /ϕSL1, which is the reverse-phase signal of a signal ϕSL1, and /ϕL1, which is the reverse-phase signal of a signal ϕL1, to high level. With this operation, the device reads out sensor noise after resetting of the sensor cell unit 101 to the common output line 102, and writes it in the CT 228. The device sets the signal ϕFT to low level at the end of writing. The sensor noise at this time is represented by Ns1.

In period (2), the potential input to the gate of the MOS transistor 221 is represented by VGR+Ns1. The device sets a signal ϕFB to high level to output a potential VRS+Ns1 to the common output line 102 via the source follower. Immediately after this operation, the device sets the signal ϕPS1 to high level to input noise (Ns1+Nt) obtained by adding noise Nt from the transfer circuit unit 201 to the sensor noise Ns1 as a noise level to the sensor cell unit 101.

In period (3), the device sets the signal ϕFT to high level, and then sets the signals /ϕL1 SL1 and /ϕL1 for operating the inverting amplifier of the sensor cell unit 101 to high level. With this operation, the sensor cell unit 101 outputs the signal obtained by adding Ns1 to the inverting amplifier output −(Ns1+Nt), that is, −Nt. At this time, since /ϕGR is set to high level, the CT 228 holds the signal VGR+Nt. The device further sets /ϕGR to low level to set one electrode of the CT 228 in a floating state.

In period (4), the device sets the signal ϕFB to high level, and then sets the signal ϕRS and the signals /ϕPS21, /ϕPS22, and /ϕPS23 for writing noise in the $CM_1$ 335, $CM_2$ 445, and $CM_3$ 545 to high level. The electrode of the transfer capacitor (CT) 228 which is located on the common output line 102 side is set at the potential VRS and varies by an amount corresponding to the noise Nt. Therefore, the potential of the other electrode of the transfer capacitor CT 228 also varies by an amount corresponding to Nt. With this operation, the same noise is output from the source follower and written in the $CM_1$ 335 of the first memory cell unit 301, the $CM_2$ 445 of the second memory cell unit 401, and the $CM_3$ 545 of the third memory cell unit 501. This noise is represented by 2Nt.

In period (5), the device resets the sensor cell unit 101 by setting the signals ϕRS, ϕFT, and ϕPS1 to high level. At the same time, the device also resets the CT 228 by setting /ϕGR, which is the reverse-phase signal of the signal ϕGR, to high level.

In period (6), the sensor cell unit 101 enters an optical accumulation operation period, and performs real-time AGC operation of controlling an output set gain by monitoring an optical signal in real time. Let $S_4$ be an optical signal accumulated in the sensor cell unit 101. Operation during a real-time AGC period will be described below.

The sensor cell unit 101 sets the signal /ϕGR for fixing the input of the source follower to a constant voltage VGR and the signal ϕFT for fixing the common output line 102 to a constant voltage VRS to high level, maintains the signal ϕRS at high level, and sets the potentials of the two electrodes of the CT 228 to the constant voltages VGR and VRS, respectively. The sensor cell unit 101 also sets the signal /ϕGR to low level to set the other electrode of the CT 228 in a floating state.

Subsequently, the device sets the signals /ϕL1 SL1 and /ϕL1 to high level to add the sensor noise Ns2 to an inverted output $(S_4+Ns2+Nt)$ from the sensor cell unit 101. As a result, $-(S_4+Nt)$ is output to the transfer circuit unit 201. Since the potential of the CT 228 on the common output line 102 side varies by an amount corresponding to $-(S_4+Nt)$, the other electrode of the CT 228 is set at $VGR-(S_4+Nt)$. When the transfer circuit unit 201 outputs a signal, the noise Nt from the transfer circuit unit 201 is added to the signal. Therefore, the transfer circuit unit 201 outputs an optical signal $-S_4$ from an output 203. With the above operation, the device performs real-time AGC by monitoring the optical signal $-S_4$.

Figure 10:
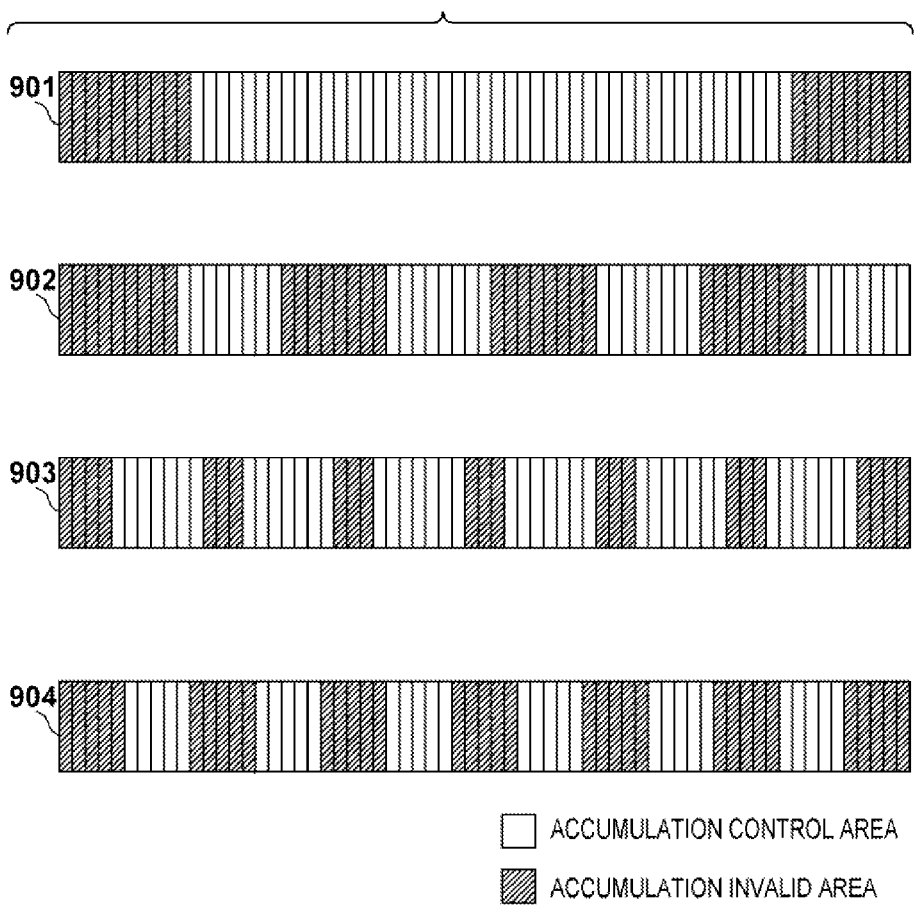
FIG. 10 is a view showing the first to fourth measurement point placement methods in the first embodiment.

FIG. 10 shows four patterns with different measurement point placement methods on one line. This device changes a measurement point placement by time division control. The case shown in FIG. 10 will be described below. The white pixel group areas without hatching are accumulation control areas, which correspond to AF measurement points, whereas the hatched pixel group areas are accumulation invalid areas. A first measurement point placement method 901 is a placement method to be used when a very large range is regarded as one measurement point. A second measurement point placement method 902 is a placement method to be used when four measurement points are placed on one line. A third measurement point placement method 903 is a placement method to be used when six measurement points are placed on one line. A fourth measurement point placement method 904 is a placement method to be used when six measurement points are placed on one line like the third measurement point placement method 903. However, the fourth measurement point placement method 904 is a division method for performing so-called spot AF in narrower ranges.

Operation will be described by referring back to the timing chart of FIG. 9, assuming that the end of accumulation in the accumulation control area in the first measurement point placement method 901 has been determined.

In period (7), the device sets signals /ϕSL21 and /ϕL2 to high level to drive the inverting amplifier in order to overwrite the third memory cell unit 501 with the reset noise 2Nt held in the first memory cell unit 301. Thereafter, the device sets the write switch signal /ϕPS23 to high level. At this time, the device writes $-2Nt+Nm1$ in the $CM_3$ 545 of the third memory cell unit 501 upon adding noise Nm1 from the first memory cell unit 301.

In period (8), the device sets signals /ϕSL23 and /ϕL2 for overwriting the second memory cell unit 401 with the noise signal held in the third memory cell unit 501 again to high level to drive the inverting amplifier, and then sets the write switch signal /ϕPS22 to high level. Since the first to third memory cell units have the same layout, the noise Nm generated in each memory cell unit can be regarded as $Nm1 \approx Nm2 \approx Nm3$. For this reason, the noise signal output from the third memory cell unit 501 via the inverting amplifier becomes $-(-2Nt+Nm1)+Nm3$, and the device writes 2Nt in the $CM_2$ 445 of the second memory cell unit 401.

In period (9), the device obtains an optical signal $-S_{41}$ after the end of an optical accumulation operation period in the first measurement point placement method 901, and sets the signals /ϕSL1, /ϕL1, and /ϕGR to high level. The other electrode of the CT 228 is fixed to the constant voltage VGR, and the potential of the electrode of the CT 228 on the common output line 102 side varies from VRS by $-(S_{41}+Nt)$.

In period (10), the device sets /ϕSL21, which is the reverse-phase signal of the signal ϕSL21, and the signal /ϕL2 to high level to read out the noise 2Nt accumulated in the first memory cell unit 301 via the inverting amplifier. The device adds the noise Nm1 from the first memory cell unit 301 to the signal. As a result, the device reads out $-2Nt+Nm1$ at the electrode of the CT 228 on the common output line 102 side. In this case, the device writes a potential variation amount corresponding to $-2Nt+Nm1-(-(S_{41}+Nt))=S_{41}-Nt+Nm1$ in the CT 228.

In period (11), the device sets the signal ϕFT to low level, sets the signal ϕFB to high level, and sets the signals ϕFB and /ϕPS21 to high level. The device then writes $S_{41}+Nm1$ in the $CM_1$ 335 of the first memory cell unit 301 upon adding the noise Nt from the transfer circuit unit 201.

In period (12), the device performs the readout operation of the first memory cell unit 301. The device sets the signal ϕFB to low level, and sets the signals /ϕSL21 and /ϕL2 for operating the inverting amplifier of the first memory cell unit 301 and the signal ϕFT for electrically connecting the common output line 102 and the MOS transistor 224 to high level. The device adds the noise Nm1 from the first memory cell unit 301 to an inverted signal $-(S_{41}+Nm1Nm1)$ from the first memory cell unit 301, and finally outputs $-S_{41}$ from which a noise component has been removed. The device sequentially reads out the signals for each column by setting the signal ϕH to high level.

Operation will be described, assuming that the end of accumulation in the accumulation control areas in the second measurement point placement method 902 has been determined.

In period (13), the device sets signals /ϕSL22 and /ϕL2 to high level to drive the inverting amplifier in order to overwrite the third memory cell unit 501 with the reset noise 2Nt held in the second memory cell unit 401. Thereafter, the device sets the write switch signal /ϕPS23 to high level. At this time, the device writes $-2Nt+Nm1$ in the $CM_3$ 545 of the third memory cell unit 501 upon adding the noise Nm1 from the first memory cell unit 301.

In period (14), the device sets signals /ϕSL23 and /ϕL2 for overwriting the first memory cell unit 301 with the noise signal held in the third memory cell unit 501 again to high level to drive the inverting amplifier, and then sets the write switch signal /ϕPS21 to high level. Since the first to third memory cell units have the same layout, the noise Nm generated in each memory cell unit can be regarded as Nm1≈Nm2≈Nm3. For this reason, the noise signal output from the third memory cell unit 501 via the inverting amplifier becomes −(−2Nt+Nm1)+Nm3, and the device writes 2Nt in the $CM_1$ 335 of the first memory cell unit 301.

In period (15), the device obtains an optical signal $-S_{42}$ after the end of an optical accumulation operation period in the second measurement point placement method 902, and sets the signals /φSL1, /φL1, and /φGR to high level. The other electrode of the CT 228 is fixed to the constant voltage VGR, and the potential of the electrode of the CT 228 on the common output line 102 side varies from VRS by $-(S_{42}+Nt)$.

In period (16), the device sets /φSL21, which is the reverse-phase signal of the signal φSL21, and the signal /φL2 to high level to read out the noise 2Nt accumulated in the first memory cell unit 301 via the inverting amplifier. The device adds the noise Nm1 from the second memory cell unit 401 to this signal. As a result, the device reads out −2Nt+Nm1 at the electrode of the CT 228 on the common output line 102 side. In this case, the device writes a potential variation amount corresponding to $-2Nt+Nm1-(-(S_{42}+Nt))=S_{42}-Nt+Nm1$ in the CT 228.

In period (17), the device sets the signal φFT to low level, sets the signal φFB to high level, and sets the signals φFB and /φPS21 to high level. The device then writes $S_{42}+Nm1$ in the $CM_1$ 335 of the first memory cell unit 301 upon adding the noise Nt from the transfer circuit unit 201.

In period (18), the device performs the readout operation of the first memory cell unit 301. The device sets the signal φFB to low level, and sets the signals /φSL21 and /φL2 for operating the inverting amplifier of the first memory cell unit 301 and the signal φFT for electrically connecting the common output line 102 and the MOS transistor 224 to high level. The device adds the noise Nm1 from the first memory cell unit 301 to an inverted signal $-(S_{42}+Nm1Nm1)$ from the first memory cell unit 301, and finally outputs $-S_{42}$ from which a noise component has been removed. The device sequentially reads out the signals for each column by setting the signal φH to high level.

Operation will be described, assuming that the end of accumulation in the accumulation control areas in the third measurement point placement method 903 has been determined.

In period (19), the device sets the signals /φSL22 and /φL2 to high level to drive the inverting amplifier in order to overwrite the third memory cell unit 501 with the 2Nt held in the second memory cell unit 401. Thereafter, the device sets the write switch signal /φPS23 to high level. At this time, the device writes −2Nt+Nm1 in the $CM_3$ 545 of the third memory cell unit 501 upon adding noise Nm1 from the first memory cell unit 301.

In period (20), the device sets the signals /φSL23 and /φL2 for overwriting the first memory cell unit 301 with the noise signal held in the third memory cell unit 501 again to high level to drive the inverting amplifier, and then sets the write switch signal /φPS21 to high level. Since the first to third memory cell units have the same layout, the noise Nm generated in each memory cell unit can be regarded as Nm1≈Nm2≈Nm3. For this reason, the noise signal output from the third memory cell unit 501 via the inverting amplifier becomes −(−2Nt+Nm1)+Nm3, and the device writes 2Nt in the $CM_1$ 335 of the first memory cell unit 301.

In period (21), the device obtains an optical signal $-S_{43}$ after the end of an optical accumulation operation period in the third measurement point placement method 903, and sets the signals /φSL1, /φL1, and /φGR to high level. The other electrode of the CT 228 is fixed to the constant voltage VGR, and the potential of the electrode of the CT 228 on the common output line 102 side varies from VRS by $-(S_{43}+Nt)$.

In period (22), the device sets /φSL21, which is the reverse-phase signal of the signal φSL21, and the signal /φL2 to high level to read out the noise 2Nt accumulated in the first memory cell unit 301 via the inverting amplifier. The device adds the noise Nm1 from the second memory cell unit 401 to this signal. As a result, the device reads out −2Nt+Nm1 at the electrode of the CT 228 on the common output line 102 side. In this case, the device writes a potential variation amount corresponding to $-2Nt+Nm1-(-(S_{43}+Nt))=S_{43}-Nt+Nm1$ in the CT 228.

In period (23), the device sets the signal φFT to low level, sets the signal φFB to high level, and sets the signals φFB and /φPS21 to high level. The device then writes $S_{43}+Nm1$ in the $CM_1$ 335 of the first memory cell unit 301 upon adding the noise Nt from the transfer circuit unit 201.

In period (24), the device performs the readout operation of the first memory cell unit 301. The device sets the signal φFB to low level, and sets the signals /φSL21 and /φL2 for operating the inverting amplifier of the first memory cell unit 301 and the signal φFT for electrically connecting the common output line 102 and the MOS transistor 224 to high level. The device adds the noise Nm1 from the first memory cell unit 301 to an inverted signal $-(S_{43}+Nm1Nm1)$ from the first memory cell unit 301, and finally outputs $-S_{43}$ from which a noise component has been removed. The device sequentially reads out the signals for each column by setting the signal φH to high level.

Operation will be described, assuming that the end of accumulation in the accumulation control areas in the fourth measurement point placement method 904 has been determined.

In period (25), the device sets the signals /φSL22 and /φL2 to high level to drive the inverting amplifier in order to overwrite the third memory cell unit 501 with the 2Nt held in the second memory cell unit 401. Thereafter, the device sets the write switch signal /φPS23 to high level. At this time, the device writes −2Nt+Nm1 in the $CM_3$ 545 of the third memory cell unit 501 upon adding noise Nm1 from the first memory cell unit 301.

In period (26), the device sets signals /φSL23 and /φL2 for overwriting the first memory cell unit 301 with the noise signal held in the third memory cell unit 501 again to high level to drive the inverting amplifier, and then sets the write switch signal /φPS21 to high level. Since the first to third memory cell units have the same layout, the noise Nm generated in each memory cell unit can be regarded as Nm1≈Nm2≈Nm3. For this reason, the noise signal output from the third memory cell unit 501 via the inverting amplifier becomes −(−2Nt+Nm1)+Nm3, and the device writes 2Nt in the $CM_1$ 335 of the first memory cell unit 301.

In period (27), the device obtains an optical signal $-S_{44}$ after the end of an optical accumulation operation period in the fourth measurement point placement method 904, and sets the signals /φSL1, /φL1, and /φGR to high level. The other electrode of the CT 228 is fixed to the constant voltage VGR, and the potential of the electrode of the CT 228 on the common output line 102 side varies from VRS by $-(S_{44}+Nt)$.

In period (28), the device sets /φSL21, which is the reverse-phase signal of the signal φSL21, and the signal /φL2 to high level to read out the noise 2Nt accumulated in the first memory cell unit 301 via the inverting amplifier. The device adds the noise Nm1 from the second memory cell unit 401 to this signal. As a result, the device reads out −2Nt+Nm1 at the electrode of the CT 228 on the common output line 102 side. In this case, the device writes a potential variation amount corresponding to $-2Nt+Nm1-(-(S_{44}+Nt))=S_{44}-Nt+Nm1$ in the CT 228.

In period (29), the device sets the signal φFT to low level, sets the signal φFB to high level, and sets the signals φFB and /φPS21 to high level. The device then writes $S_{44}$+Nm1 in the $CM_1$ 335 of the first memory cell unit 301 upon adding the noise Nt from the transfer circuit unit 201.

In period (30), the device performs the readout operation of the first memory cell unit 301. The device sets the signal φFB to low level, and sets the signals /φSL21 and /φL2 for operating the inverting amplifier of the first memory cell unit 301 and the signal φFT for electrically connecting the common output line 102 and the MOS transistor 224 to high level. The device adds the noise Nm1 from the first memory cell unit 301 to an inverted signal –($S_{44}$+Nm1), and finally outputs –$S_{44}$ from which a noise component has been removed. The device sequentially reads out the signals for each column by setting the signal φH to high level.

As described above, reading out a noise signal at the time of resetting upon overwriting the other memory cell unit is equivalent to providing a plurality of memory cell units for one sensor cell unit. This makes it possible to increase the number of measurement points. This embodiment has exemplified the measurement point placement methods with the four patterns. Obviously, however, the embodiment can cope with measurement point placement methods with more patterns. In addition, the embodiment allows to continuously perform focus detection while changing the patterns of the measurement point placement methods, and hence can shorten the time required for focus detection.

(Third Embodiment)

Figure 11:
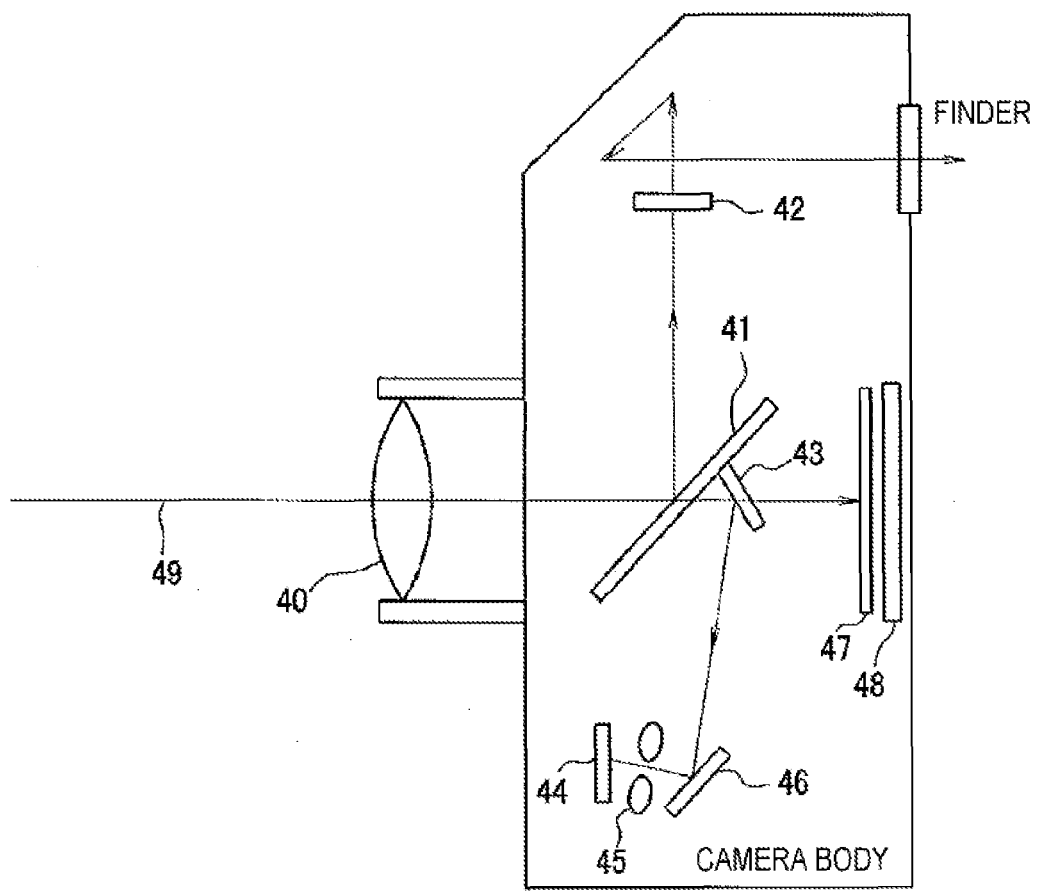
FIG. 11 is a view showing a single-lens reflex camera according to the third embodiment of the present invention.

FIG. 11 is a schematic view of the optical system of a digital single-lens reflex camera equipped with a TTL-ISR type auto focus system according to the third embodiment of the present invention. Reference numeral 40 denotes a photographing lens for forming an optical image of an object on a film or an image sensor 48 and an AF sensor 44; 41, a quick return mirror for reflecting light to a finder screen 42, which also serves as a half mirror which transmits several 10% of light; 43, a sub-mirror for guiding light to the AF system; 44, an automatic focus detection photoelectric conversion device (AF sensor) according to the first and second embodiments; 45, a secondary imaging lens (eyeglass lens) for forming an object image on the AF sensor 44 again; 46, a reflecting mirror for guiding light to the AF sensor 44; 47, a focal plane shutter; 48, a film or image sensor; and 49, the main axis of a light beam.

In this embodiment, using the automatic focus detection photoelectric conversion device according to the first and second embodiments can implement a single-lens reflex camera which can increase the number of measurement points and has excellent low luminance limit performance without decreasing the focusing speed. The first to third embodiments can provide an inexpensive photoelectric conversion device (AF sensor) which prevents an increase in chip area because it is possible to implement, with the minimum number of memories, both focus detection using signals with a plurality of different accumulation times and focus detection in a plurality of different accumulation control areas.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A photoelectric conversion device comprising:
   a common output line;
   a sensor cell unit configured to output a signal obtained by photoelectric conversion in a photoelectric converter, to said common output line;
   a transfer circuit unit connected to said common output line;
   a first memory cell unit connected to said common output line;
   a second memory cell unit connected to said common output line; and
   a third memory cell unit connected to said common output line,
   wherein said first memory cell unit holds a reset noise signal originating from resetting of the photoelectric converter, wherein said third memory cell unit holds a reset noise signal, the reset noise signal being a reset noise signal held by said first memory cell unit and output from said first memory cell unit,
   wherein said second memory cell unit holds a reset noise signal, that reset noise signal being a reset noise signal held by said third memory cell unit and output from said third memory cell unit, and
   wherein said transfer circuit unit holds a signal obtained by adding a reset noise signal held by and output from said second memory cell unit to a signal output from said sensor cell unit.

2. The device according to claim 1, wherein said sensor cell unit includes a sensitivity switching unit for switching between a low sensitivity mode and a high sensitivity mode,
   said first memory cell unit holds a reset noise signal originating from resetting of said photoelectric converter, said transfer circuit, said first to third memory cell unit in the low sensitivity mode,
   in the high sensitivity mode, said second memory cell unit and said third memory cell unit hold a reset noise signal originating from resetting of the photoelectric converter, and
   in the low sensitivity mode, said third memory cell unit holds a reset noise signal held by said first memory cell unit and output from said first memory cell unit, and said second memory cell unit then holds a reset noise signal held by said third memory cell unit and output from said third memory cell unit.

3. The device according to claim 1, wherein said first memory cell unit, said second memory cell unit, and said third memory cell unit each have an amplification gain of –1.

4. The device according to claim 1, wherein said second memory cell unit holds an addition signal held by said transfer circuit unit.

5. A camera system comprising:
   a photoelectric conversion device defined in claim 1; and
   a lens for forming an optical image on said photoelectric conversion device.

6. A photoelectric conversion device comprising:
   a sensor cell unit operable in a low sensitivity mode and a high sensitivity mode;
   a first memory cell unit;
   a second memory cell unit; and
   a third memory cell unit, wherein
   the sensor cell unit is set to the low sensitivity mode, and the first memory cell unit is caused to hold a reset noise signal originating from resetting of the photoelectric converter in the low sensitivity mode,
   the sensor unit cell is set to the high sensitivity mode, and the second memory cell unit and the third memory cell unit are caused to hold a reset noise signal in the high sensitivity mode, and
   thereafter, the sensor cell unit starts an accumulation in the high sensitivity mode, and in case the sensor cell unit is switched to the low sensitivity mode, a reset noise signal corresponding to the reset noise signal held by the first memory cell unit is written in the third memory cell unit.

7. The device according to claim 6, further comprising a transfer circuit unit, wherein, in the second operation mode, the transfer circuit unit outputs the reset noise signal to be written in the third memory cell unit, based on the reset noise signal held by the first memory cell unit.

8. The device according to claim 7, wherein the transfer circuit unit is configured to output, as the noise signal to be written in the third memory cell unit, a reset noise signal that is an inverted signal of the reset noise signal held by the first memory cell unit.

9. The device according to claim 6, comprising a plurality of the sensor cell unit, a plurality of the first memory cell unit, a plurality of the second memory cell unit, and a plurality of the third memory cell unit.

10. A focus detection apparatus comprising a photoelectric conversion device defined in claim 9, wherein the photoelectric conversion device is configured to perform a focus detection based on a phase difference detection method.

11. A camera system comprising:
   a focus detection apparatus defined in claim 10; and
   a lens for forming an optical image on the focus detection apparatus.

12. The device according to claim 6, wherein said sensor cell unit further comprises:
   a photoelectric conversion element connected to a first node;
   an amplifier configured to output a signal based on a voltage of said first node;
   a capacitor; and
   a switch connected between said capacitor and said first node,
   wherein said switch is OFF in the high sensitivity mode, and is ON in the low sensitivity mode.

13. A focus detection unit comprising the photoelectric conversion device defined in claim 1.

14. A driving method of a photoelectric conversion device that comprises a sensor cell unit operable in a low sensitivity mode and a high sensitivity mode, a first memory cell unit, and second and third memory cell units, wherein the method comprises:
   setting the sensor cell unit to the low sensitivity mode, and causing the first memory cell unit to hold a reset noise signal originating from resetting of the photoelectric converter in the low sensitivity mode;
   setting the sensor unit cell to the high sensitivity mode, and causing the second memory cell unit and the third memory cell unit to hold a reset noise signal in the high sensitivity mode; and
   thereafter, starting an accumulation by the sensor cell unit in the high sensitivity mode, and in a case where the sensor cell unit is switched to the low sensitivity mode, writing, in the third memory cell unit, a reset noise signal corresponding to the reset noise signal held by the first memory cell unit.

15. The driving method according to claim 14, wherein the sensor cell unit includes a photoelectric conversion element connected to a first node, an amplifier configured to output a signal based on a voltage of the first node, a capacitor, and a switch connected between the capacitor and the first node, and
   wherein the switch is OFF in the high sensitivity mode and is ON in the low sensitivity mode.

* * * * *